United States Patent
Chen et al.

(10) Patent No.: US 10,063,861 B2
(45) Date of Patent: Aug. 28, 2018

(54) METHODS AND SYSTEMS OF PERFORMING PREDICTIVE RANDOM ACCESS USING A BACKGROUND PICTURE

(71) Applicant: QUALCOMM Incorporated, San Diego, CA (US)

(72) Inventors: Ying Chen, San Diego, CA (US); Xuerui Zhang, San Diego, CA (US); Mayank Tiwari, San Diego, CA (US); Ning Bi, San Diego, CA (US); Prasanjit Panda, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 15/131,574

(22) Filed: Apr. 18, 2016

(65) Prior Publication Data
US 2017/0105005 A1    Apr. 13, 2017

Related U.S. Application Data

(60) Provisional application No. 62/238,647, filed on Oct. 7, 2015.

(51) Int. Cl.
*H04N 19/00* (2014.01)
*H04N 19/159* (2014.01)
(Continued)

(52) U.S. Cl.
CPC ......... *H04N 19/159* (2014.11); *H04N 19/105* (2014.11); *H04N 19/172* (2014.11); *H04N 19/188* (2014.11); *H04N 19/58* (2014.11)

(58) Field of Classification Search
CPC .................................................... H04N 19/58
(Continued)

(56) References Cited

U.S. PATENT DOCUMENTS

2012/0230401 A1* 9/2012 Chen ................ H04N 21/44016
                                                          375/240.12
2013/0279576 A1* 10/2013 Chen ................ H04N 19/00684
                                                          375/240.12
(Continued)

FOREIGN PATENT DOCUMENTS

CN       104703027 A       6/2015
EP         0496536 A2      7/1992
(Continued)

OTHER PUBLICATIONS

Schierl T., et al., "System Layer Integration of High Efficiency Video Coding," IEEE Transactions on Circuits and Systems for Video Technology, vol. 22 (12), XP011487157,Dec. 2012, pp. 1871-1884.*
(Continued)

*Primary Examiner* — Jeffery Williams
(74) *Attorney, Agent, or Firm* — Kilpatrick Townsend & Stockton LLP

(57) ABSTRACT

Techniques and systems are provided for performing predictive random access using a background picture. For example, a method of decoding video data includes obtaining an encoded video bitstream comprising a plurality of pictures. The plurality of pictures include a plurality of predictive random access pictures. A predictive random access picture is at least partially encoded using inter-prediction based on at least one background picture. The method further includes determining, for a time instance of the video bitstream, a predictive random access picture of the plurality of predictive random access pictures with a time stamp closest in time to the time instance. The method further includes determining a background picture associated with the predictive random access picture, and decoding at least a portion of the predictive random access picture using inter-prediction based on the background picture.

30 Claims, 14 Drawing Sheets

(51) Int. Cl.
*H04N 19/58* (2014.01)
*H04N 19/105* (2014.01)
*H04N 19/172* (2014.01)
*H04N 19/169* (2014.01)

(58) Field of Classification Search
USPC .................................................. 375/240.02
See application file for complete search history.

(56) References Cited

U.S. PATENT DOCUMENTS

2016/0277734 A1\* 9/2016 Ai ........................... H04N 19/70
2016/0330468 A1 11/2016 Minezawa et al.
2017/0105004 A1 4/2017 Chen et al.

FOREIGN PATENT DOCUMENTS

| EP | 3070947 A1 | 9/2016 |
| WO | 2012094290 A1 | 7/2012 |
| WO | 2015115644 A1 | 8/2015 |

OTHER PUBLICATIONS

Dong S., et.al., "Performance Evaluation for AVS2 Video Coding Techniques", IEEE International Conference on Multimedia Big Data, Apr. 22, 2015 (Apr. 22, 2015), pp. 411-414, XP055324442.

Gao W., et.al., "Scene Video Coding", Advanced Video Coding Systems, Springer International Publishing, Jan. 1, 2014 ( Jan. 1, 2014), pp. 135-160, XP055324771.

International Search Report and Written Opinion—PCT/US2016/055364—ISA/EPO—dated Dec. 14, 2016.

Manoranjan Paul et al: "Video coding using the most common frame in scene", Acoustics Speech and Signal Processing (ICASSP), 2010 IEEE International Conference on, IEEE, Piscataway, NJ, USA, Mar. 14, 2010 (Mar. 14, 2010), pp. 734-737, XP031697008, ISBN; 978-1-4244-4295-9 the whole document.

Pettersson M., et al., "Dependent Random Access Point Pictures in HEVC", 2015 IEEE International Conference on Image Processing (ICIP), IEEE, Sep. 27, 2015 (Sep. 27, 2015), XP032826592, pp. 867-871, DOI: 10.11 09/ICIP.2015.7350923 [retrieved on Sep. 12, 2015].

Pettersson M., et al., "HLS: Dependent RAP Indication SEI message", 18. JCT-VC meeting, Jun. 30, 2014- Sep. 7, 2014, Sapporo, (Joint Collaborative Team on Video Coding of ISO/IEC JTC1/SC29/WG11 and ITU-T SG.16 ), URL: http://wftp3.itu.int/AV-ARCH/JCTVC-SITE/, No. JCTVC-R0059, Jun. 19, 2014 (Jun. 19, 2014), XP030116302, the whole document.

Zuo X., et.al., "Library Based Coding for Videos with Repeated Scenes", Picture Coding Symposium (PCS), IEEE, May 31, 2015, XP032951341, pp. 100-104.

Zhang X., et al., "Optimizing the Hierarchical Prediction and Coding in HEVC for Surveillance and Conference Videos With Background Modeling," IEEE Transactions on Image Processing, vol. 23, No. 10, Oct. 10, 2014, pp. 4511-4526.

\* cited by examiner

700

Monitor_ay

Ay_street_level

900

Pacific

Sorrento_view

1100

OBTAIN A BACKGROUND PICTURE, THE BACKGROUND PICTURE BEING GENERATED BASED ON A PLURALITY OF PICTURES CAPTURED BY AN IMAGE SENSOR, AND WHEREIN THE BACKGROUND PICTURE IS GENERATED TO INCLUDE BACKGROUND PORTIONS IDENTIFIED IN EACH OF THE CAPTURED PICTURES
1102

ENCODE, INTO A VIDEO BITSTREAM, A GROUP OF PICTURES CAPTURED BY THE IMAGE SENSOR, WHEREIN THE GROUP OF PICTURES COMPRISES AT LEAST ONE RANDOM ACCESS PICTURE, WHEREIN ENCODING THE GROUP OF PICTURES COMPRISES ENCODING AT LEAST A PORTION OF THE AT LEAST ONE RANDOM ACCESS PICTURE USING INTER-PREDICTION BASED ON THE BACKGROUND PICTURE
1104

OBTAIN AN ENCODED VIDEO BITSTREAM COMPRISING A PLURALITY OF PICTURES, WHEREIN THE PLURALITY OF PICTURES COMPRISE A PLURALITY OF PREDICTIVE RANDOM ACCESS PICTURES, AND WHEREIN A PREDICTIVE RANDOM ACCESS PICTURE IS AT LEAST PARTIALLY ENCODED USING INTER-PREDICTION BASED ON AT LEAST ONE BACKGROUND PICTURE
1202

↓

DETERMINE, FOR A TIME INSTANCE OF THE VIDEO BITSTREAM, A PREDICTIVE RANDOM ACCESS PICTURE OF THE PLURALITY OF PREDICTIVE RANDOM ACCESS PICTURES WITH A TIME STAMP CLOSEST IN TIME TO THE TIME INSTANCE
1204

↓

DETERMINE A BACKGROUND PICTURE ASSOCIATED WITH THE PREDICTIVE RANDOM ACCESS PICTURE
1206

↓

DECODE AT LEAST A PORTION OF THE PREDICTIVE RANDOM ACCESS PICTURE USING INTER-PREDICTION BASED ON THE BACKGROUND PICTURE
1208

FIG. 12

METHODS AND SYSTEMS OF PERFORMING PREDICTIVE RANDOM ACCESS USING A BACKGROUND PICTURE

CROSS-REFERENCE TO RELATED APPLICATIONS

This application claims the benefit of U.S. Provisional Application No. 62/238,647, filed Oct. 7, 2015, which is hereby incorporated by reference, in its entirety.

FIELD

The present disclosure generally relates to random access for video content, and more specifically to techniques and systems for performing predictive random access based on a background picture.

BACKGROUND

Many devices and systems allow video data to be processed and output for consumption. For example, an Internet protocol camera (IP camera) is a type of digital video camera that can be employed for surveillance or other applications. Unlike analog closed circuit television (CCTV) cameras, an IP camera can send and receive data via a computer network and the Internet. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high-efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

In some embodiments, techniques and systems are described that provide a background picture based coding scheme. For example, a new random access picture is provided that can predictively depend on a background picture. The new random access picture is referred to as a predictive random access picture. An encoder can encode the predictive random access picture into a video bitstream by performing inter-prediction and using the background picture as a reference picture. A decoder can receive the video bitstream and can decode the predictive random access picture using inter-prediction based on the background picture. In some examples, the predictive random access picture can be coded using either intra-prediction or using inter-prediction with the background picture as the reference picture. In such examples, both the intra-prediction and the inter-prediction options can be made available for coding the predictive random access picture.

A video analytics engine can be used to provide intelligence for the coding system. The video analytics engine can generate one or more background pictures using video data from one or more network-connected cameras. For example, the video analytics engine can generate the background picture from one or more captured video pictures using background extraction (or background subtraction), or other suitable technique. The intelligence provided by the video analytics can be used by a video encoder to achieve efficient management of the bandwidth of recorded video.

In some embodiments, techniques and systems are also described for performing random access based on the background picture and the predictive random access picture, including how to perform random access on the bitstream level and on the transport and application level. In some examples, modifications to a video file format are described to enable random access based on predictive random access pictures, allowing the file format to recognize background pictures and predictive random access pictures and allowing a player and/or decoder to make use of the background pictures and predictive random access pictures for random access.

According to at least one example, a method of encoding video data is provided that includes obtaining a background picture. The background picture is generated based on a plurality of pictures captured by an image sensor, and the background picture is generated to include background portions identified in each of the captured pictures. The method further comprises encoding, into a video bitstream, a group of pictures captured by the image sensor, wherein the group of pictures comprises at least one random access picture. Encoding the group of pictures comprises encoding at least a portion of the at least one random access picture using inter-prediction based on the background picture.

In another example, an apparatus is provided that includes a memory configured to store video data and a processor. The processor is configured to and can obtain a background picture, the background picture being generated based on a plurality of pictures captured by an image sensor, and wherein the background picture is generated to include background portions identified in each of the captured pictures. The processor is further configured to and can encode, into a video bitstream, a group of pictures captured by the image sensor, wherein the group of pictures comprises at least one random access picture, wherein encoding the group of pictures comprises encoding at least a portion of the at least one random access picture using inter-prediction based on the background picture.

In another example, a computer readable medium is provided having stored thereon instructions that when executed by a processor perform a method that includes: obtaining a background picture, the background picture being generated based on a plurality of pictures captured by an image sensor, and wherein the background picture is generated to include background portions identified in each of the captured pictures; and encoding, into a video bitstream, a group of pictures captured by the image sensor, wherein the group of pictures comprises at least one random access picture, wherein encoding the group of pictures comprises encoding at least a portion of the at least one random access picture using inter-prediction based on the background picture.

In another example, an apparatus is provided that includes means for obtaining a background picture, the background picture being generated based on a plurality of pictures captured by an image sensor, and wherein the background picture is generated to include background portions identified in each of the captured pictures. The apparatus further comprises means for encoding, into a video bitstream, a group of pictures captured by the image sensor, wherein the group of pictures comprises at least one random access picture, wherein encoding the group of pictures comprises encoding at least a portion of the at least one random access picture using inter-prediction based on the background picture.

In some aspects, encoding at least the portion of the at least one random access picture using inter-prediction based on the background picture comprises predicting at least the portion of the at least one random access picture using the background picture as a reference picture.

The method, apparatuses, and computer readable medium described above for encoding video data may further comprise encoding the background picture into the video bitstream. The method, apparatuses, and computer readable medium described above for encoding video data may further comprise encoding the background picture as a long-term reference picture. The method, apparatuses, and computer readable medium described above for encoding video data may further comprise encoding the background picture as a short term reference picture.

The method, apparatuses, and computer readable medium described above for encoding video data may further comprise encoding at least the portion of the at least one random access picture using inter-prediction based on the background picture when the background picture is determined to be available as a reference picture.

The method, apparatuses, and computer readable medium described above for encoding video data may further comprise assigning a value of 0 to a picture output flag of the background picture.

The method, apparatuses, and computer readable medium described above for encoding video data may further comprise obtaining an updated background picture; replacing the background picture with the updated background picture; and encoding at least a portion of a random access picture using inter-prediction based on the updated background picture. In some aspects, the background picture is active for a period of time, and the updated background picture is obtained upon expiration of the period of time.

In some aspects, the group of pictures further comprises at least one picture following the at least one random access picture in decoding order and preceding the at least one random access picture in output order, wherein the at least one random access picture allows the at least one picture to be predicted using one or more pictures preceding the at least one random access picture in decoding order.

In some aspects, the group of pictures further comprises at least one picture following the at least one random access picture in decoding order and preceding the at least one random access picture in output order, wherein the at least one random access picture disallows the at least one picture from being predicted using any picture preceding the at least one random access picture in decoding order except the background picture.

In some aspects, the group of pictures includes at least one network abstraction layer unit containing at least a portion of the at least one random access picture, wherein a header of the at least one network abstraction layer unit comprises a random access picture type indication assigned to network abstraction layer units of random access pictures encoded using inter-prediction based on one or more background pictures.

In some aspects, the group of pictures includes at least one network abstraction layer unit containing at least a portion of the background picture, wherein a header of the at least one network abstraction layer unit comprises a background picture type indication.

In some aspects, the background picture includes a synthesis background picture generated using a statistical model.

In some aspects, the background picture includes a semi-synthesis background picture, wherein background pixels of the semi-synthesis background are determined from background pixel values of a current picture, and wherein foreground pixels of the semi-synthesis background are determined from an expectation of a statistical model.

In some aspects, the background picture includes a non-synthesis background picture, and wherein the non-synthesis background picture is set as a current picture when a similarity in pixel values between the current picture and a synthesis background picture is within a threshold.

In some aspects, the background picture includes a non-synthesis background picture, and wherein the non-synthesis background picture is selected from one or more pictures occurring prior in time to a current picture when a similarity in pixel values between the current picture and a synthesis background picture is outside a threshold.

According to another example, a method of decoding video data is provided that includes obtaining an encoded video bitstream comprising a plurality of pictures. The plurality of pictures comprise a plurality of predictive random access pictures. A predictive random access picture is at least partially encoded using inter-prediction based on at least one background picture. The method further comprises determining, for a time instance of the video bitstream, a predictive random access picture of the plurality of predictive random access pictures with a time stamp closest in time to the time instance. The method further comprises determining a background picture associated with the predictive random access picture, and decoding at least a portion of the predictive random access picture using inter-prediction based on the background picture.

In another example, an apparatus is provided that includes a memory configured to store video data and a processor. The processor is configured to and can obtain an encoded video bitstream comprising a plurality of pictures. The plurality of pictures comprise a plurality of predictive random access pictures. A predictive random access picture is at least partially encoded using inter-prediction based on at least one background picture. The processor is further configured to and can determine, for a time instance of the video bitstream, a predictive random access picture of the plurality of predictive random access pictures with a time stamp closest in time to the time instance. The processor is further configured to and can determine a background picture associated with the predictive random access picture. The processor is further configured to and can decode at least a portion of the predictive random access picture using inter-prediction based on the background picture.

In another example, a computer readable medium is provided having stored thereon instructions that when executed by a processor perform a method that includes: obtaining an encoded video bitstream comprising a plurality of pictures, wherein the plurality of pictures comprise a plurality of predictive random access pictures, and wherein a predictive random access picture is at least partially encoded using inter-prediction based on at least one background picture; determining, for a time instance of the video bitstream, a predictive random access picture of the plurality of predictive random access pictures with a time stamp closest in time to the time instance; determining a background picture associated with the predictive random access picture; and decoding at least a portion of the predictive random access picture using inter-prediction based on the background picture.

In another example, an apparatus is provided that includes means for obtaining an encoded video bitstream comprising a plurality of pictures. The plurality of pictures comprise a plurality of predictive random access pictures. A predictive random access picture is at least partially encoded using inter-prediction based on at least one background picture. The apparatus further comprises means for determining, for a time instance of the video bitstream, a predictive random access picture of the plurality of predictive random access pictures with a time stamp closest in time to the time instance. The apparatus further comprises means for determining a background picture associated with the predictive random access picture, and means for decoding at least a portion of the predictive random access picture using inter-prediction based on the background picture.

In some aspects, the background picture associated with the predictive random access picture precedes the predictive random access picture in decoding order and has a time stamp closest in time to the time stamp of the predictive random access picture.

In some aspects, the method, apparatuses, and computer readable medium described above for decoding video data may further comprise receiving a message indicating that the predictive random access picture is of a predictive random access type.

In some aspects, the method, apparatuses, and computer readable medium described above for decoding video data may further comprise receiving a message indicating that the background picture is of a background picture type.

In some aspects, the plurality of pictures further comprises at least one picture following the predictive random access picture in decoding order and preceding the predictive random access picture in output order, wherein the at least one picture includes a message indicating that the at least one picture is associated with the predictive random access picture.

In some aspects, the at least one picture includes a predictive random access decodable leading picture.

In some aspects, the at least one picture includes a predictive random access skipped leading picture.

In some aspects, decoding at least the portion of the predictive random access picture using inter-prediction based on the background picture comprises predicting at least the portion of the predictive random access picture using the background picture as a reference picture.

In some aspects, the background picture is encoded into the video bitstream. In some aspects, the background picture is encoded as a long-term reference picture. In some aspects, the background picture is encoded as a short term reference picture.

In some aspects, the plurality of pictures include at least one network abstraction layer unit containing at least a portion of the predictive random access picture, wherein a header of the at least one network abstraction layer unit comprises a predictive random access picture type indication assigned to network abstraction layer units of random access pictures encoded using inter-prediction based on one or more background pictures.

In some aspects, the plurality of pictures include at least one network abstraction layer unit containing at least a portion of the background picture, wherein a header of the at least one network abstraction layer unit comprises a background picture type indication.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 11 is a flowchart illustrating an embodiment of a process of encoding video data, in accordance with some embodiments.

FIG. 12 is a flowchart illustrating an embodiment of a process of decoding video data, in accordance with some embodiments.

DETAILED DESCRIPTION

Figure 1:
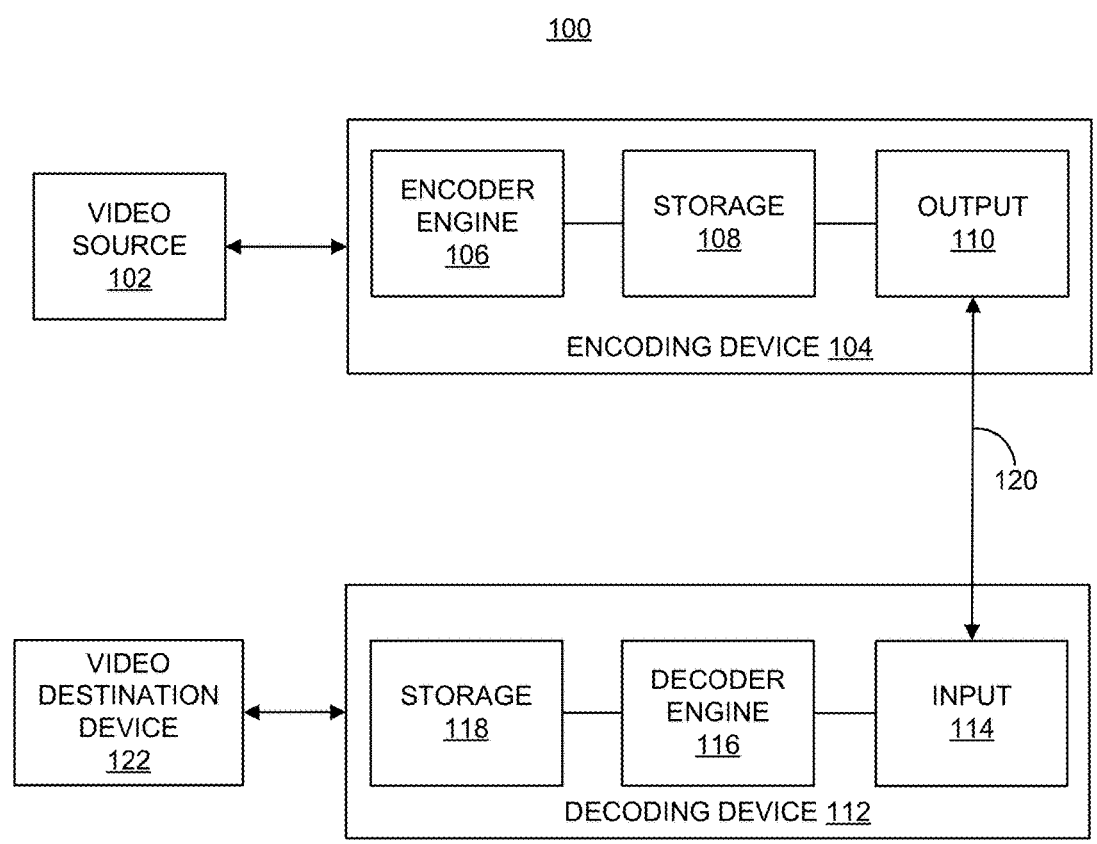
FIG. 1 is a block diagram illustrating an example of an encoding device and a decoding device, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

Several systems and methods of video coding using video encoders, decoders, and other coding processing devices are described herein. For example, one or more systems and methods of coding are described that utilize the intelligence provided by video analytics to achieve efficient management of the bandwidth of recorded video. Video analytics can be used to provide intelligence for a coding system, including generating a background picture that can be used as a reference picture for coding a new type of random access picture, hereinafter referred to as a predictive random access picture. A predictive random access picture can predictively depend on a background picture. For example, one or more predictive random access pictures can be encoded into a video bitstream by performing inter-prediction using one or more background pictures as reference pictures. A decoder receiving the video bitstream can decode one or more of the predictive random access pictures by performing inter-prediction using one or more of the background pictures. In some cases, a predictive random access picture can alternatively be coded using intra-prediction, with both intra-prediction and inter-prediction (based on a background picture) being available for coding the predictive random access picture. Systems and methods are also described for performing random access based on the background picture and the predictive random access picture, including techniques of how to perform such random access both in the bitstream level and transport/application level.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Moving Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol.

Many embodiments described herein describe examples using the HEVC standard, or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

A video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source. One example of a video source 102 can include an Internet protocol camera (IP camera). An IP camera is a type of digital video camera that can be used for surveillance, home security, or other suitable application. Unlike analog closed circuit television (CCTV) cameras, an IP camera can send and receive data via a computer network and the Internet.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma or a chroma component that uses the same motion parameters for inter-prediction. The luma PB and one or more chroma PBs, together with associated syntax, form a prediction unit (PU). A set of motion parameters is signaled in the bitstream for each PU and is used for inter-prediction of the luma PB and the one or more chroma PBs. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding node and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU level. In some examples, the one or more slices of a picture are assigned a slice type. Slice types include an I slice, a P slice, and a B slice. An I slice (intra-frames, independently decodable) is a slice of a picture that is only coded by Intra prediction, and therefore is independently decodable since the I slice requires only the data within the frame to predict any block of the slice. A P slice (uni-directional predicted frames) is a slice of a picture that may be coded with intra-prediction and uni-directional inter-prediction. Each block within a P slice is either coded with Intra prediction or inter-prediction. When the inter-prediction applies, the block is only predicted by one reference picture, and therefore reference samples are only from one reference region of one frame. A B slice (bi-directional predictive frames) is a slice of a picture that may be coded with intra-prediction and inter-prediction. A block of a B slice may be bi-directional predicted from two reference pictures, where each picture contributes one reference region and sample sets of the two reference regions are weighted (e.g., with equal weights) to produce the prediction signal of the bi-directional predicted block. As explained above, slices of one picture are independently coded. In some cases, a picture can be coded as just one slice.

A PU may include data related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

The encoding device 104 may then perform transformation and quantization. For example, following prediction, the encoder engine 106 may calculate residual values corresponding to the PU. Residual values may comprise pixel difference values. Any residual data that may be remaining after prediction is performed is transformed using a block transform, which may be based on discrete cosine transform, discrete sine transform, an integer transform, a wavelet transform, or other suitable transform function. In some cases, one or more block transforms (e.g., sizes 32×32, 16×16, 8×8, 4×4, or the like) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gate-ways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

Supplemental Enhancement information (SEI) messages can be included in video bitstreams. For example, SEI messages may be used to carry information (e.g., metadata) that is not essential in order to decode the bitstream by the decoding device 112. This information is useful in improving the display or processing of the decoded output (e.g. such information could be used by decoder-side entities to improve the viewability of the content).

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 13. An example of specific details of the decoding device 112 is described below with reference to FIG. 14.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence or bitstream. A coded video sequence is a series of access units that starts with a random access point picture (e.g., an instantaneous decoding refresh (IDR) picture or broken link access (BLA) picture, or other appropriate random access point picture) and includes all access units up to but not including the next random access point picture (or the end of the bitstream). The information in an SPS does not typically change from picture to picture within a coded video sequence. All pictures in a coded video sequence use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

VCL NAL units include coded picture data forming the coded video bitstream. Various types of VCL NAL units are defined in the HEVC standard, as illustrated in Table A below.

TABLE A

| NAL UNIT TYPE VALUE | NAL UNIT TYPE SYNTAX NAME | CONTENT OF NAL UNIT (PICTURE) | DESCRIPTION OF PICTURE |
|---|---|---|---|
| TRAILING NON-IRAP PICTURES | | | |
| 0 | TRAIL_N | Coded Slice (or slice segment) of a Non-TSA, non-STSA Trailing Picture | Sub-Layer Non-Reference |
| 1 | TRAIL_R | Coded Slice (or slice segment) of a Non-TSA, non-STSA Trailing Picture | Sub-Layer Reference |
| 2 | TSA_N | Coded Slice (or slice segment) of a Temporal Sub-Layer Access (TSA) Picture | Sub-Layer Non-Reference |
| 3 | TSA_R | Coded Slice (or slice segment) of a TSA Picture | Sub-Layer Reference |
| 4 | STSA_N | Coded Slice (or slice segment) of a Step-Wise Temporal Sub-Layer (STSA) Picture | Sub-Layer Non-Reference |
| 5 | STSA_R | Coded Slice (or slice segment) of a STSA Picture | Sub-Layer Reference |
| LEADING PICTURES | | | |
| 6 | RADL_N | Coded Slice (or slice segment) of a Random Access Decodable Leading (RADL) Picture | Sub-Layer Non-Reference |
| 7 | RADL_R | Coded Slice (or slice segment) of a RADL Picture | Sub-Layer Reference |
| 8 | RASL_N | Coded Slice (or slice segment) of a Random Access Skipped Leading (RASL) Picture | Sub-Layer Non-Reference |
| 9 | RASL_R | Coded Slice (or slice segment) of a RASL Picture | Sub-Layer Reference |
| RESERVED | | | |
| 10-15 | RSV | Reserved non-IRAP | |
| 22-23 | RSV | Reserved IRAP | |
| 24-31 | RSV | Reserved non-IRAP | |
| IRAP PICTURES | | | |
| 16 | BLA_W_LP | Coded Slice (or slice segment) of a Broken Link Access (BLA) Picture | May Have Leading Pictures |
| 17 | BLA_W_RADL | Coded Slice (or slice segment) of a BLA Picture | May Have RADL Leading Pictures |
| 18 | BLA_N_LP | Coded Slice (or slice segment) of a BLA Picture | Without Leading Pictures |
| 19 | IDR_W_RADL | Coded Slice (or slice segment) of an Instantaneous Decoding Refresh (IDR) Picture | May Have Leading Pictures |
| 20 | IDR_N_LP | Coded Slice (or slice segment) of an IDR Picture | Without Leading Pictures |

TABLE A-continued

| NAL UNIT TYPE VALUE | NAL UNIT TYPE SYNTAX NAME | CONTENT OF NAL UNIT (PICTURE) | DESCRIPTION OF PICTURE |
| --- | --- | --- | --- |
| 21 | CRA | Coded Slice (or slice segment) of a Clean Random Access (CRA) Picture | May Have Leading Pictures |

In a single-layer bitstream, as defined in the first HEVC standard, VCL NAL units contained in an AU have the same NAL unit type value, with the NAL unit type value defining the type of AU and the type of coded picture within the AU. For example, VCL NAL units of a particular AU may include instantaneous decoding refresh (IDR) NAL units (value 19), making the AU an IDR AU and the coded picture of the AU an IDR picture. The given type of a VCL NAL unit is related to the picture, or portion thereof, contained in the VCL NAL unit (e.g., a slice or slice segment of a picture in a VCL NAL unit). Three classes of pictures are defined in the HEVC standard, including leading pictures, trailing pictures, and intra random access (IRAP) pictures (also referred to as "random access pictures"). In a multi-layer bitstream, VCL NAL units of a picture within an AU have the same NAL unit type value and the same type of coded picture. For example, the picture that contains VCL NAL units of type IDR is said to be an IDR picture in the AU. In another example, when an AU contains a picture that is an IRAP picture at the base layer (the layer ID equal to 0), the AU is an IRAP AU.

Figure 2:
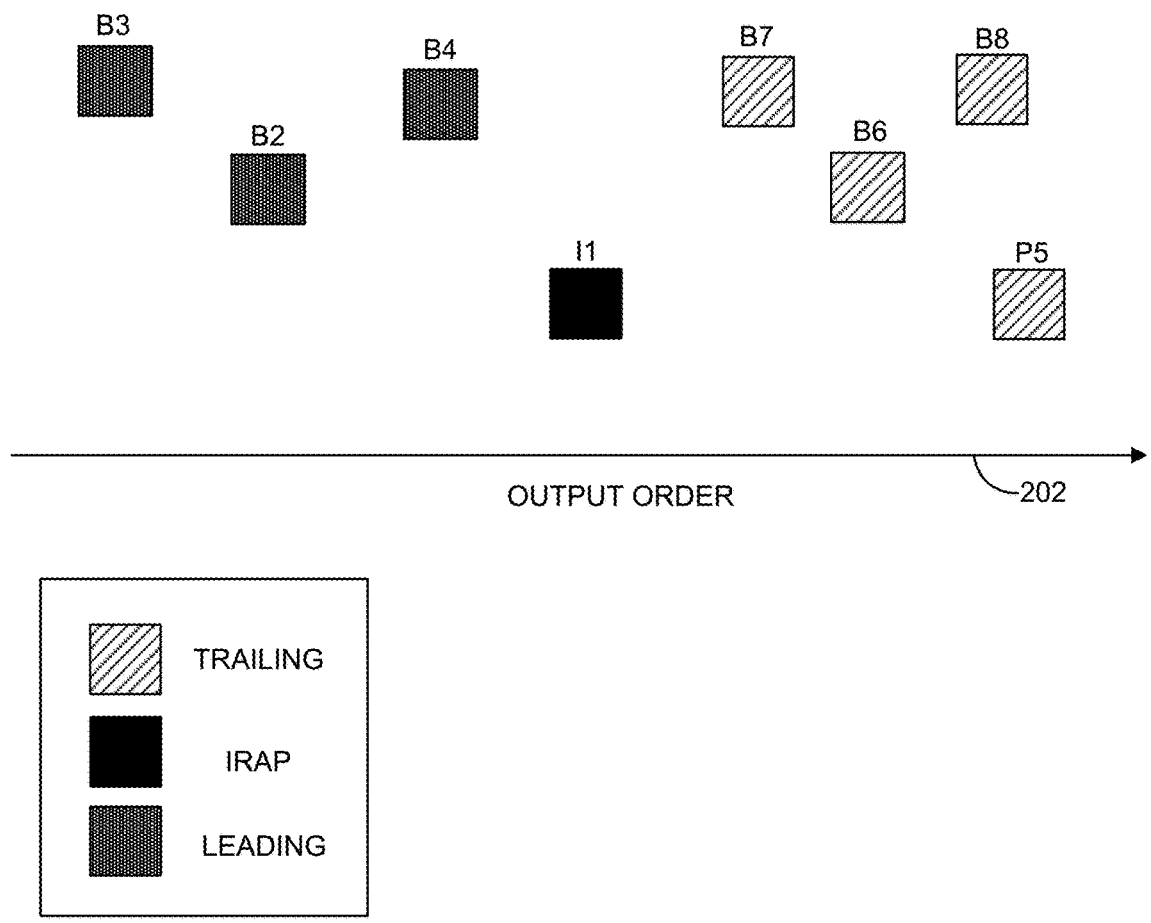
FIG. 2 is an example of pictures of an encoded video bitstream, in accordance with some embodiments.

FIG. 2 is an example of pictures of an encoded video bitstream including an TRAP picture I1 and leading and trailing pictures associated with the TRAP picture I1. The pictures are linearly displayed in output order in the direction of the arrow 202, and the numbers 1-8 (I1, B2, B3, B4, P5, B6, B7, B8) indicate the decoding order of the pictures. TRAP pictures provide points in a bitstream where decoding can begin. For example, decoding can begin at an TRAP picture so that pictures following the TRAP picture in output order, inclusive, can be output even if all pictures that precede the IRAP picture in decoding order are discarded from the bitstream (e.g., due to bitstream splicing, or the like). Because it is possible to start decoding at an TRAP picture, an IRAP picture is not dependent on any other picture in the bitstream. For example, IRAP pictures belong to temporal sub-layer 0 and are coded without using content of any other pictures as reference data (e.g., intra-prediction coding is used). The first picture of a bitstream is an TRAP picture, and other TRAP pictures may also be present in the bitstream. In a multi-layer bitstream, IRAP pictures that have a layer ID greater than 0 (layers other than a base layer) may use inter-layer prediction. For example, the TRAP pictures may use inter-layer prediction based on pictures that belong to the same access unit and have lower layer ID. As described below, a new predictive random access picture is described that can be coded using inter-prediction with a background picture as a reference picture.

Pictures B2, B3, and B4 include leading pictures of the IRAP picture I1. A leading picture is a picture that follows an IRAP picture in decoding order, but precedes the IRAP picture in output order. As illustrated in FIG. 2, leading pictures B2, B3, and B4 are after IRAP picture I1 in decoding order, and come before the IRAP picture I1 in output order. In some embodiments, leading pictures use one of the leading picture NAL Unit types 6-9 shown in Table A above.

Pictures P5, B6, B7, and B8 include trailing pictures of the IRAP picture I1. A trailing picture is a picture that follows an IRAP picture in decoding order and in output order. As illustrated in FIG. 2, trailing pictures P5, B6, B7, and B8 follow the IRAP picture I1 in decoding order and also in output order. Trailing pictures use one of the trailing picture NAL Unit types 0-5 shown in Table A above.

Leading pictures and trailing pictures are associated with the closest IRAP picture in decoding order (picture I1 in FIG. 2). In some embodiments, the decoding order of an IRAP picture and its associated trailing and leading pictures is defined based on certain conditions of leading and trailing pictures. For example, trailing pictures depend on an associated IRAP picture and other trailing pictures of the same IRAP picture. Trailing pictures associated with an IRAP picture do not depend on any leading pictures, and also do not depend on any trailing pictures of previous IRAP pictures. Leading pictures associated with an IRAP picture precede trailing pictures (in decoding order) that are associated with the same IRAP picture. Based on these conditions, and similar other conditions that are not listed here, the decoding order of the IRAP picture I1 and its associated trailing and leading pictures is the IRAP picture I1, followed by the trailing pictures B2, B3, B4, followed by the leading pictures P5, B6, B7, B8.

Various types of trailing pictures, leading pictures, and IRAP pictures are available. For example, trailing pictures include temporal sub-layer access (TSA) pictures, step-wise temporal sub-layer access (STSA) pictures, and ordinary trailing pictures (TRAIL). A TSA picture indicates a temporal sub-layer switching point at which switching can occur up to any higher sub-layer. A STSA picture indicates a temporal sub-layer switching point at which switching can occur to the sub-layer with the same temporal layer identifier as the STSA picture. TSA and STSA pictures belong to temporal sub-layers with temporal identifiers greater than 0. A TRAIL picture can belong to any temporal sub-layer, and does not indicate a temporal sub-layer switching point. In multi-layer bitstreams, STSA pictures that belong to the layer with layer ID greater than 0 can also belong to the temporal sub-layer with temporal sub-layer equal to 0.

Leading picture types include random access decodable leading (RADL) pictures and random access skipped leading (RASL) pictures. A RADL picture is a leading picture that is decodable when random access is performed at the IRAP picture with which the RADL picture is associated. In some embodiments, RADL pictures reference, for prediction purposes, only the associated IRAP picture and other RADL pictures that are also associated with the IRAP picture. A RASL picture is a leading picture that may not be decodable when random access is performed from an associated IRAP picture. A RASL picture is not decodable when a picture that the RASL picture uses for reference precedes the IRAP picture in decoding order. The RASL picture is not decodable because a decoder performing random access at the IRAP picture will not decode the picture that precedes the IRAP picture in decoding order, and thus will also not decode the RASL picture. RASL pictures can reference other types of pictures (e.g., IRAP pictures, other RASL pictures, RADL pictures, or the like). In some examples, only RASL pictures can be dependent on other RASL pictures, in which case every picture that depends on a RASL picture is a RASL picture.

Random access is an important feature for video codecs. For example, random access is used for video streaming, video broadcasting, multi-party video telephony, and many other applications, to tune-in to a sequence of video. Based on the random access points (e.g., an IRAP picture), video editing or analysis can be made easier, for example, in terms of number of pictures to be decoded to reach to a specific frame of interest. Different types of random access pictures are used for coding video data and allowing random access, including Instantaneous Decoding Refresh (IDR) pictures, Clean Random Access (CRA) pictures, and Broken Link Access (BLA) pictures. In H.264/AVC, the random access pictures are coded as IDR pictures. An IDR picture is an intra-picture (I-picture) that completely refreshes or reinitializes the decoding process at the decoder and starts a new CVS. For example, an IDR picture is not only coded as an I picture, but also breaks the temporal prediction in the decoding order. An DR picture and any picture following the DR picture in decoding order cannot be dependent on any picture that comes before the IDR picture in decoding order. Accordingly, pictures following an IDR picture in decoding order cannot use pictures decoded prior to the IDR picture as reference. In some cases, RASL pictures are not allowed to be associated with an IDR picture.

Figure 3:
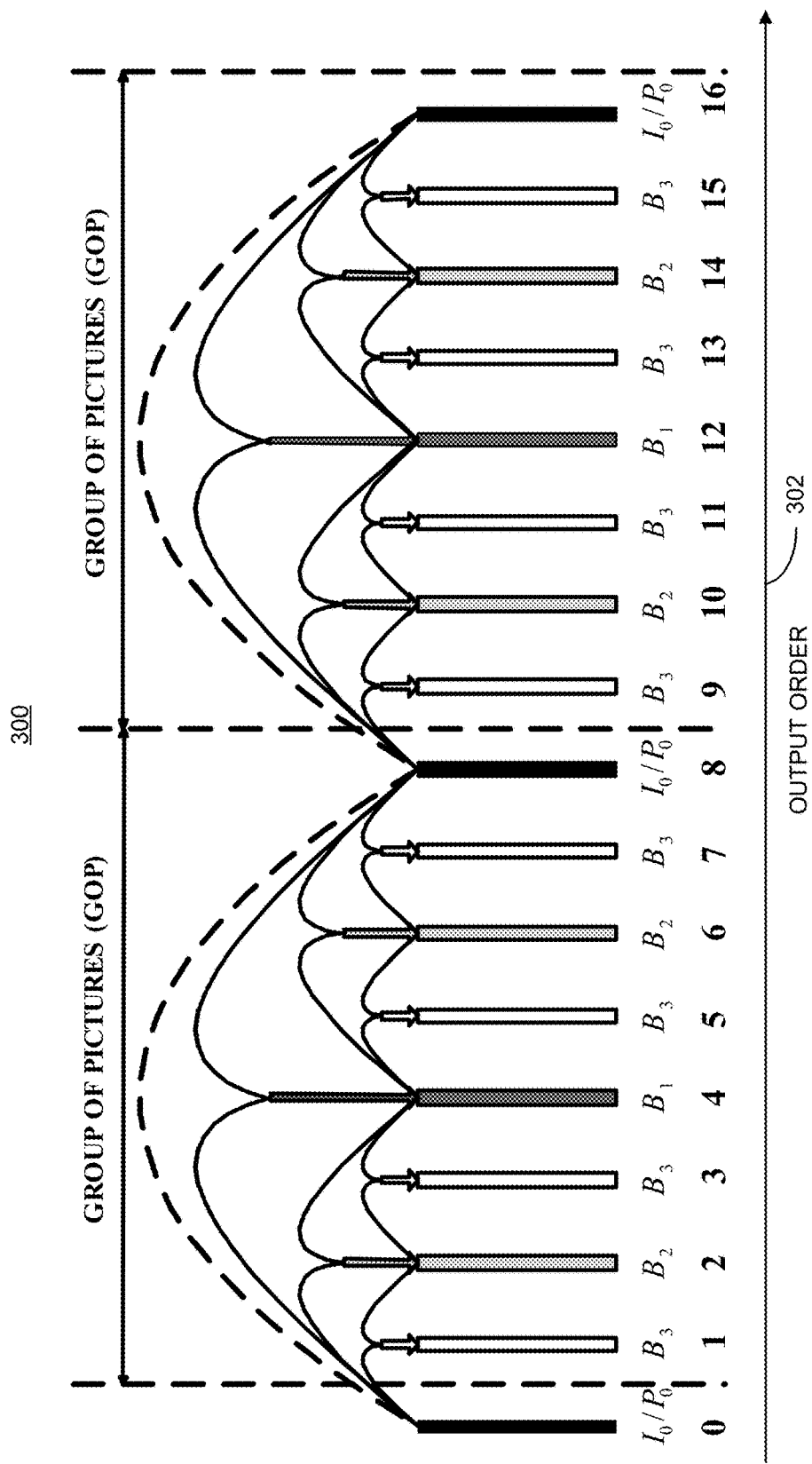
FIG. 3 is another example of pictures of an encoded video bitstream, in accordance with some embodiments.

FIG. 3 is an example of pictures of an encoded video bitstream including IDR pictures. The bitstream includes hierarchical B picture coding with four temporal levels and a group of picture (GOP) size of 8. The pictures are linearly displayed in output order in the direction of the arrow 302. As shown in FIG. 3, the first Intra coded picture ($I_0$) is an IDR picture. Note that, due to the prediction structure, display order and decoding order of the pictures in a coded video sequence may not be the same. Pictures belonging to a certain prediction structure may be referred to as a Group of pictures (GOP).

In HEVC, more types of random access pictures are defined in addition to IDR pictures. For example, to improve coding efficiency, CRA pictures in HEVC allows pictures that follow the CRA picture in decoding order but precede the CRA picture in output order to use pictures decoded before the CRA picture as reference, while still allowing similar clean random access functionality as an IDR picture. As shown in FIG. 3, if the picture in display order 16 is coded as I picture, it is actually a CRA picture. Clean random access is ensured by guaranteeing that pictures that follow a CRA picture in both decoding and output order (also referred to as "display order") are decodable if random access is performed at the CRA picture. In some aspects, a CRA picture is an I-picture. A CRA picture does not refresh the decoder and does not begin a new CVS, allowing leading pictures of the CRA picture to depend on pictures that come before the CRA picture in decoding order. In some examples, a CRA picture may have associated RADL pictures and RASL pictures. Random access may be done at a CRA picture by decoding the CRA picture, leading pictures associated with the CRA picture that are not dependent on any picture coming before the CRA picture in decoding order, and all associated pictures that follow the CRA in both decoding and output order. In some cases, a CRA picture may not have associated leading pictures. In the multi-layer case, an IDR or a CRA picture that belongs to a layer with layer ID greater than 0 may be a P-picture or a B-picture, but these pictures can only use inter-layer prediction from other pictures that belong to the same access unit as the IDR or CRA picture, and that have a layer ID less than the layer containing the IDR or CRA picture. In some cases, in HEVC, a conforming bitstream may contain no IDR pictures at all.

IRAP pictures provide the ability to splice bitstreams together. For example, an encoder, a bitstream editor (or "editor"), a splicer, or other network device may splice bitstreams together using an IRAP picture. Bitstream splicing allows seamless switching from one compressed video bitstream to another compressed video bitstream. For example, splicing occurs by replacing a first IRAP AU and all subsequent AUs of a first compressed bitstream with a second IRAP AU and subsequent AUs of a second compressed bitstream. CRA pictures can be used for splicing compressed video bitstreams (in addition to random access, as previously described). For example, the first and second IRAP AUs may include CRA pictures. In some embodiments, IDR pictures can be used for splicing compressed video bitstreams. In some cases, it is not necessary that the first AU should contain an IRAP picture. In multi-layer bitstreams, splicing can occur when the second AU contains an IRAP picture that belongs to base layer.

In some cases, after splicing occurs, a RASL picture that follows a CRA picture in decoding order may not be decodable in the event the RASL picture references one or more pictures that are no longer in the bitstream after splicing. In some examples, an encoder, editor, splicer, or other device may discard the RASL pictures during splicing. In other examples, a broken link splicing option may be used to indicate that a picture order count timeline, as well as prediction from pictures preceding the CRA picture (in decoding order) that RASL pictures may depend on, are broken when splicing is done.

A third type of IRAP picture, called a Broken link access (BLA) picture, is similar to CRA in terms of the status of pictures following the BLA picture in decoding order but prior to the BLA picture in output order. A BLA picture can be used to signal that bitstream splicing has been done. For example, a BLA picture can be used to inform a decoder when a splicing operation has occurred so that the decoder can determine whether associated RASL pictures should be decoded. During splicing, the CRA picture in the new bitstream that is used for splicing is treated as a BLA picture. When broken link splicing is performed, RASL pictures may be kept, and a decoder that comes across such a BLA picture may discard the RASL pictures associated with the BLA picture. In the event the decoder encounters a CRA picture, the decoder will decode RASL pictures associated with the CRA picture. When a decoder comes across a BLA picture or a CRA picture, the decoder will decode all RADL pictures associated with the BLA and CRA pictures, respectively. A BLA picture refreshes or reinitializes the decoding process at the decoder and starts a new CVS. In some embodiments, a BLA picture may be used even when splicing has not occurred.

Decoded pictures may be stored in a buffer (e.g., a decoded picture buffer (DPB)) and used for prediction of the later decoded pictures (pictures later in decoding order). The pictures used for prediction of later decoded pictures may be referred to as reference pictures. Since the buffer size is typically limited, management of those pictures is needed. A Picture Order Count (POC) is a value that uniquely identifies a picture. Every picture has a POC value assigned to it. The POC value has multiple uses, including to uniquely identify the pictures, to indicate the output position of a picture relative to other pictures in a same coded video sequence (CVS), and to perform motion vector scaling within the VCL decoding process. One or multiple ways of signaling the POC may be used. For example, the value of the picture order count (POC), represented by PicOrderCntVal, for a particular coded picture denotes the picture's relative order in the picture output process with respect to other pictures in the same CVS. At least a portion of the POC value of a picture can be signaled in a slice header. For example, the POC value can comprise of the least significant bits (LSB) and the most significant bits (MSB), and the POC value can be obtained by concatenating the MSB on its right by the LSB. In some examples, the number of bits to use for the LSB can be between 4 and 16 (e.g., as signaled in a parameter set), but can include any suitable number in other examples. In some examples, the LSB can be signaled in the slice header. In such examples, since only the LSB are signaled to the decoder, the MSB can be derived by the decoder based on a previous picture, referred to herein as a POC-anchor picture, which can be chosen using any suitable, known technique. In one illustrative example, the POC-anchor picture can be chosen as the closest previous picture of temporal layer 0 that is not a RASL picture, a RADL picture, or a sub-layer non-reference picture. The decoder can derive the POC MSB value by comparing the POC of the current picture to the POC value of the POC-anchor picture.

In H.264/AVC, the reference picture marking is summarized as follows. The maximum number, referred to as M (num_ref_frames), of reference pictures used for inter-prediction is indicated in the active sequence parameter set (SPS). When a reference picture is decoded, it is marked as "used for reference." If the decoding of the reference picture caused more than M pictures marked as "used for reference," at least one picture must be marked as "unused for reference." The DPB removal process then would remove pictures marked as "unused for reference" from the DPB if they are not needed for output as well.

When a picture is decoded, it is either a non-reference picture or a reference picture. A reference picture can be a long-term reference picture or short-term reference picture, and when a reference picture is marked as "unused for reference," it becomes a non-reference picture. In AVC, there are reference picture marking operations that change the status of the reference pictures. For example, there are two types of operation modes for the reference picture marking: sliding window and adaptive memory management control operation (MMCO). The operation mode for reference picture marking is selected on a picture basis. The sliding window operation works as a first-in-first-out queue with a fixed number of short-term reference pictures. For example, short-term reference pictures with earliest decoding time is firstly to be removed (marked as a picture "unused for reference"), in an implicit fashion. The adaptive memory control removes short-term or long-term pictures explicitly. Adaptive memory control also enables switching the status of the short-term and long-term pictures.

In H.265/HEVC, a new approach is introduced for reference picture management, referred to as an RPS or buffer description. A fundamental difference with the RPS concept compared to MMCO and sliding window operation modes of H.264/AVC is that, for each slice, a complete set of the reference pictures that are used by the current picture or any subsequent picture must be provided. Accordingly, a complete set of all pictures that must be kept in the DPB for use by the current or future picture is signaled. This is different from the H.264/AVC scheme where only relative changes to the DPB are signaled. With the RPS concept, no information from earlier pictures in decoding order is needed to maintain the correct status of reference pictures in the DPB. The RPS contains multiple RPS subsets. The subset RefPicSetStCurrBefore includes all short-term reference pictures that are prior to the current picture in both decoding order and output order, and that may be used in inter-prediction of the current picture. The subset RefPicSetStCurrAfter includes all short-term reference pictures that are prior to the current picture in decoding order, that succeed the current picture in output order, and that may be used in inter-prediction of the current picture. The subset RefPicSetStFoll includes all short-term reference pictures that may be used in inter-prediction of one or more of the pictures following the current picture in decoding order, and that are not used in inter-prediction of the current picture. The subset RefPicSetLtCurr includes all long-term reference pictures that may be used in inter-prediction of the current picture. The subset RefPicSetLtFoll includes all long-term reference pictures that may be used in inter-prediction of one or more of the pictures following the current picture in decoding order, and that are not used in inter-prediction of the current picture.

The encoding device 104, the decoding device 112, or both, can also include an image codec (not shown). A Joint Picture Experts Group (JPEG) codec is one example of an image codec. In some examples, Motion JPEG (MJPEG) may be used. MJPEG is a video compression format in which each video frame or interlaced field of a digital video sequence is compressed separately as a JPEG image. The MJPEG format can be used in an IP camera system, wherein each picture of the video sequence is coded independently with JPEG. JPEG uses a lossy form of compression based on the discrete cosine transform (DCT). This mathematical operation converts each frame or field of the video source from the spatial (2D) domain into the frequency domain (also referred to as the "transform domain"). A perceptual model based loosely on the human psychovisual system discards high-frequency information, such as sharp transitions in intensity, and color hue. In the transform domain, the process of reducing information is called quantization. For example, quantization is a method for optimally reducing a large number scale (with different occurrences of each number) into a smaller one, and the transform-domain is a convenient representation of the image because the high-frequency coefficients, which contribute less to the overall picture than other coefficients, are characteristically small-values with high compressibility. The quantized coefficients are then sequenced and losslessly packed into the output bitstream. Software implementations of JPEG can permit user control over the compression-ratio (as well as other optional parameters), allowing the user to trade off picture-quality for smaller file size.

JPEG 2000 (JP2) is an image compression standard and coding system, and was created by the Joint Photographic Experts Group committee in 2000 with the intention of superseding their original discrete cosine transform-based JPEG standard (created in 1992) with a newly designed, wavelet-based method.

In real-time applications, transmission of video content can be based on RTP/UDP/IP diagram. UDP offers a simple, sometimes unreliable datagram transport service (compared to TCP). TCP offers a byte-oriented, guaranteed transport service, which is based on re-transmission and timeout mechanisms for error control. Due to unpredictable delay characteristics of TCP, it is not suitable for real-time communication. If a TCP packet is not received, it will be simply retransmitted. Although RTP is designed for real-time transmissions, more and more real-time video applications, such as live streaming are using HTTP based video transmission system, are based on TCP. In RTP, timestamp of each packet is indicated in the header. In the HEVC, RTP payload format PACI (PAyload Content Information) has been defined to include control information in an easily accessible position in the packet header, despite the additional overhead. In HTTP based video transmission system (e.g., Dynamic Adaptive Stream over HTTP (DASH) or other video transmission systems), file containers (e.g., such as mp4 or other formats) based on an ISO base media format are used.

The ISO Base Media File Format is used as the basis for many codec encapsulation formats (e.g., the AVC file format or any other suitable codec encapsulation format), as well as for many multimedia container formats (e.g., the MPEG-4 file format, the 3GPP file format (3GP), the DVB file format, or any other suitable multimedia container format). The ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, which defines a general structure for time-based media files. It is used as the basis for other file formats in the family such as the Advanced Video Coding (AVC) file format (ISO/IEC 14496-15) and HEVC file format. Other file formats derived from the ISOBMFF include MPEG-4 file format (ISO/IEC 14496-15), 3GPP file format (3GPP TS 26.244) and AVC file format (ISO/IEC 14496-15).

ISO base media file format contains the timing, structure, and media information for timed sequences of media data, such as audio-visual presentations. In addition to continuous media (e.g., audio and video), static media (e.g., images) and metadata can be stored in a file conforming to ISO base media file format. Files structured according to the ISO base media file format may be used for many purposes, including local media file playback, progressive downloading of a remote file, segments for Dynamic Adaptive Streaming over HTTP (DASH), containers for content to be streamed and its packetization instructions, recording of received real-time media streams, or other uses.1

Figure 4:
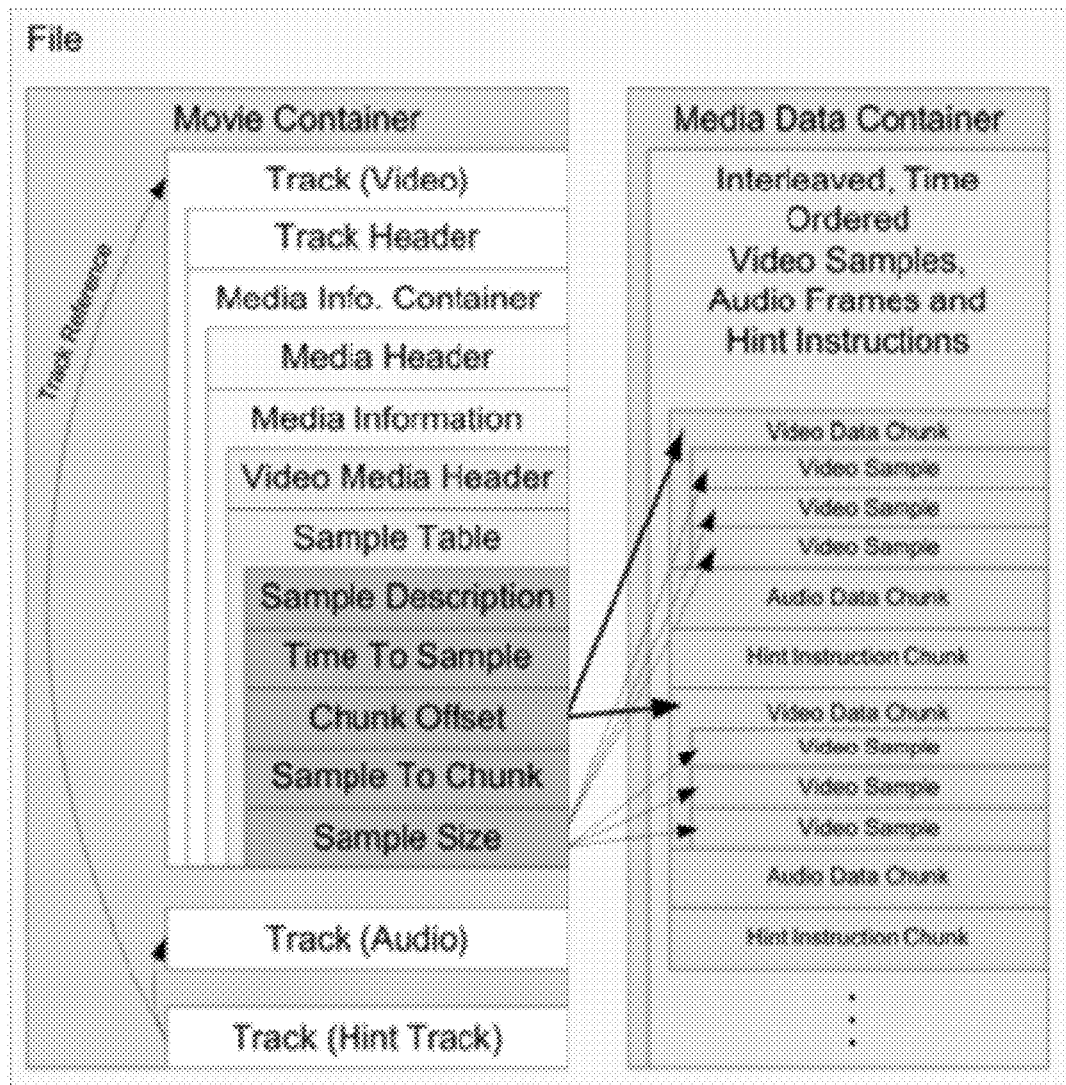
FIG. 4 is an example of a file in an ISO base media file format, in accordance with some embodiments.

FIG. 4 illustrates a file structure 400 following the ISO base media file format. An ISO-base file structure is object-oriented. The file can be decomposed into basic objects and the structure of the objects is implied from their type. For example, files conforming to the ISO base media file format are formed as a series of objects, called "boxes." All data is contained in boxes and there is no other data within the file. This data includes any initial signature required by the specific file format. The "box" is object-oriented building block defined by a unique type identifier and length.

In some examples, a media presentation is contained in one file, and the media presentation is self-contained. The movie container (movie box) contains the metadata of the media and the video and audio frames are contained in the media data container and could be in other files. In some examples, a media presentation (motion sequence) may be contained in several files. All timing and framing (position and size) information are typically in the ISO base media file and the ancillary files may be in an ISO base media file format or another format. The files have a logical structure, a time structure, and a physical structure, and these structures are not required to be coupled. The logical structure of the file is of a movie that in turn contains a set of time-parallel tracks. The time structure of the file is that the tracks contain sequences of samples in time, and those sequences are mapped into the timeline of the overall movie by optional edit lists. The physical structure of the file separates the data needed for logical, time, and structural de-composition from the media data samples themselves. This structural information is concentrated in a movie box, and are possibly extended in time by movie fragment boxes. The movie box documents the logical and timing relationships of the samples, and also contains pointers to where the samples are located. The pointers may point into the same file or another file, referenced by a URL.

Each media stream is contained in a track specialized for that media type (audio, video or other media type), and is further parameterized by a sample entry. A sample entry contains the 'name' of the exact media type (e.g., the type of the decoder needed to decode the stream) and any parameterization of the decoder that is needed. The name also takes the form of a four-character code (e.g., moov, trak, or other name). There are defined sample entry formats not only for MPEG-4 media, but also for the media types used by other organizations using this file format family. Support for metadata takes two forms. First, timed metadata may be stored in an appropriate track, synchronized as desired with the media data the metadata is describing. Secondly, there is general support for non-timed metadata attached to the movie or to an individual track. The structural support is general, and allows, as in the media data, the storage of metadata resources elsewhere in the file or in another file.

As previously noted, a box is the elementary syntax structure in the ISO base media file format, and includes a four-character coded box type, the byte count of the box, and the payload. An ISO base media file format file includes a sequence of boxes, and boxes may contain other boxes. A Movie box ("moov") contains the metadata for the continuous media streams that are present in the file, with each media stream represented in the file as a track. For example, a media stream can be contained in a track specialized for the media type of the media stream. The metadata for a track is enclosed in a Track box ("trak"), while the media content of a track is either enclosed in a Media Data box ("mdat") or directly in a separate file. The media content for tracks includes a sequence of samples, such as audio or video access units.

The ISO base media file format specifies, for example, the following types of tracks: a media track, which contains an elementary media stream; a hint track, which either includes media transmission instructions (e.g., how to form packet streams from a media track for a given protocol) or represents a received packet stream; and a timed metadata track, which comprises time-synchronized metadata.

The metadata for each track includes a list of sample description entries. Each sample description entry provides the coding or encapsulation format used in the track and the initialization data needed for processing that format. Each sample is associated with one of the sample description entries of the track.

The ISO base media file format enables specifying sample-specific metadata with various mechanisms. Specific boxes within the Sample Table box ("stbl") have been standardized to respond to common needs. For example, a Sync Sample box ("stss") is used to list the random access samples of the track. The sample grouping mechanism enables mapping of samples according to a four-character grouping type into groups of samples sharing the same property specified as a sample group description entry in the file. Several grouping types have been specified in the ISO base media file format.

The ISO base media file format specification specifies six types of Stream Access Points (SAPs) for use with DASH. The first two SAP types (types 1 and 2) correspond to instantaneous decoding refresh (IDR) pictures in H.264/AVC and HEVC. The third SAP type (type 3) corresponds to open-GOP (Group of Pictures) random access points, hence broken link access (BLA) or clean random access (CRA) pictures in HEVC. The fourth SAP type (type 4) corresponds to gradual decoding refresh (GDR) random access points.

As previously described, a capture device (e.g., video source 102) can include an Internet protocol camera (IP camera). An IP camera is a type of digital video camera that can be used for surveillance, home security, or other suitable application. An IP camera can be used to send and receive data via a computer network and the Internet. IP camera systems can be used for two-way communications. For example, data (e.g., audio, video, metadata, or the like) can be transmitted using one or more network cables or using a wireless network, allowing users to communicate with what they are seeing (e.g., a gas station clerk assisting a customer on how to use a pay pumps). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For example, IP cameras offer secure data transmission through already defined encryption and authentication methods for IP based applications. Labor cost efficiency is increased with IP cameras. For example, video analytics can produce alarms for certain events, which reduces the labor cost in monitoring all the cameras (based on the alarms) in a system.

Video Analytics, also referred to as Video Content Analysis (VCA), is a generic term used to describe computerized processing and analysis of the video sequence acquired by a camera (e.g., an IP camera or other suitable capture device). Video Analytics provides a variety of tasks ranging from immediate detection of events of interest, to analysis of pre-recorded video for the purpose of extracting events in a long period of time. Various research studies and real-life experiences indicate that in a surveillance system, for example, a human operator typically cannot remain alert and attentive for more than 20 minutes, even for monitoring the pictures from one camera. When there are two or more cameras to monitor or as time goes beyond a certain period of time (e.g., 20 minutes), the operator's ability to monitor the video and effectively respond to events is significantly compromised. Video Analytics is introduced to automatically analyze the video sequences from the cameras and send alarms for events of interest. This way, the human operator can monitor one or more scenes in a passive mode. Furthermore, Video Analytics can analyze a huge volume of recorded video and can extract specific video segments containing an event of interest.

Video Analytics provides various other features. For example, Video Analytics can operate as an Intelligent Video Motion Detector by detect moving objects and by tracking moving objects. The Video Analytics can display a bounding box around the valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like). The Video Analytics can be trained to recognize certain objects. Another function that can be performed by Video Analytics includes providing demographics for customer metrics (e.g., customer counts, gender, age, amount of time spent, and other suitable metrics). Video Analytics can also perform video search (e.g., extracting basic activity for a given region) and video summary (e.g., extraction of the key movements). Event detection can be performed by Video Analytics, including detection of fire, smoke, fighting, crowd formation, or any other suitable even the Video Analytics is programmed to detect. A detector typically triggers the detection of event of interest and sends alarm to a central control room to alert a user of the event of interest.

Video Analytics can also perform background extraction (also referred to as "background subtraction") from video. Background extraction can be used to segment moving objects from the global background in a video sequence.

One or more systems and methods of coding are described herein that utilize the intelligence provided by video analytics. For example, video analytics can be used to provide intelligence for a coding system, including generating a background picture from captured video pictures. For example, the sequence of images captured by an IP camera (or other suitable capture device) may share a common background, and video analytics can perform background extraction to extract the background region of one or more of the images. An IP camera may require a large amount of storage and high transmission bandwidth for the captured video, regardless of whether event driven recording is used. A more efficient mechanism is desired to achieve efficient management of the storage and bandwidth of recorded video.

Embodiments include systems and methods that synergistically combine video analytics with video recording in a way that allows a more efficient encoding of the captured scene to be achieved. Various aspects of video systems (e.g., video surveillance systems) are addressed herein. In any given embodiment, the various embodiments and aspects may be combined or be used separately as would be apparent to those of skill in the art.

Figure 5:
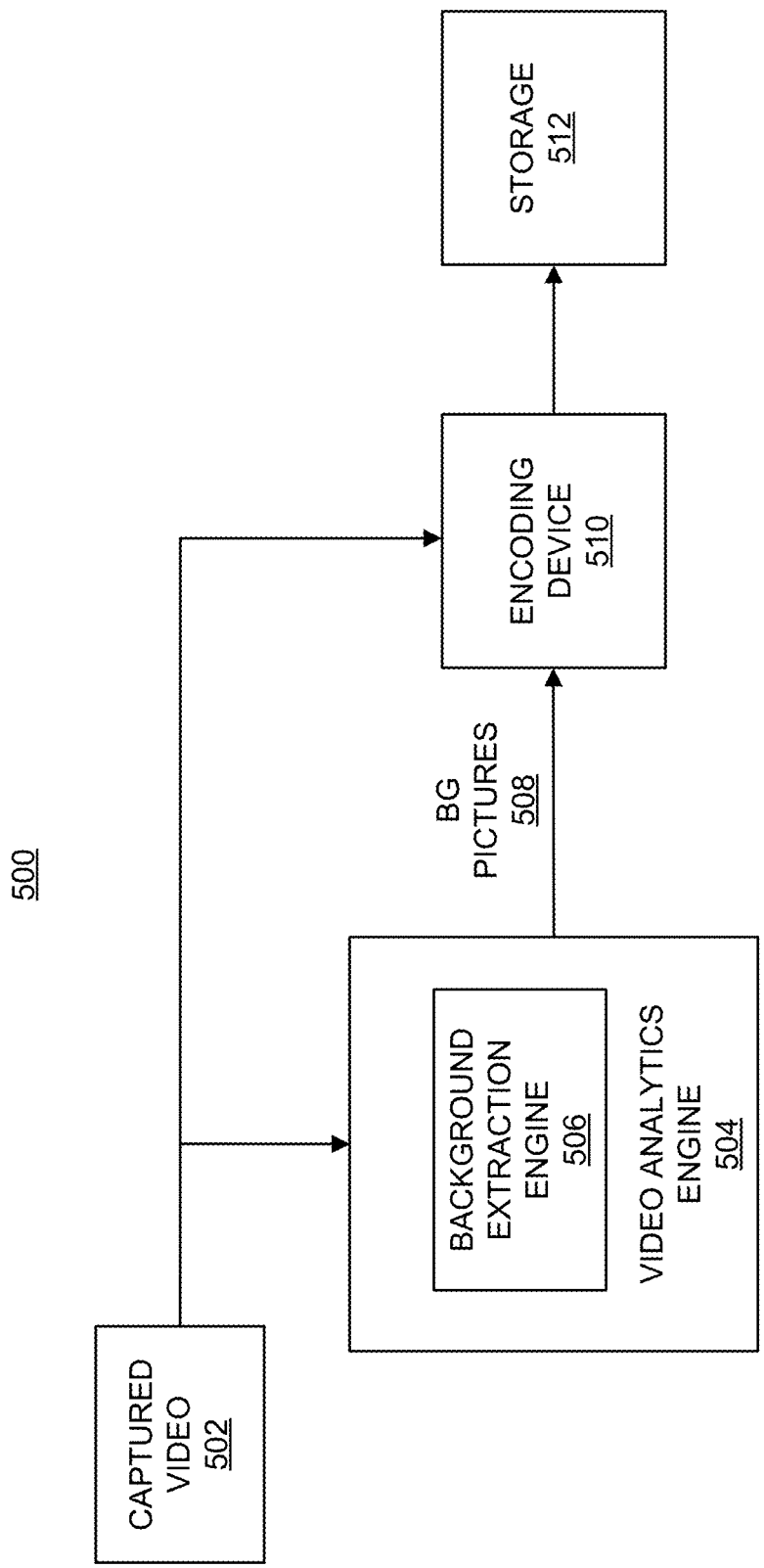
FIG. 5 is a block diagram illustrating an example of a coding system using intelligence from video analytics, in accordance with some embodiments.

FIG. 5 illustrates a system 500 including a video analytics based video encoding device 510 that utilizes video analytics intelligence for coding video. The system 500 includes a video analytics engine 504, an encoding device 510, and a storage device 512. Captured video 502 including captured pictures is received and processed by the video analytics engine 504. For example, the background extraction engine 506 can generate one or more background pictures 508 from the captured video pictures.

Various methods exist for background extraction in video. The background extraction engine 506 can generate background pictures 508 using any suitable background extraction technique. One example of a background extraction method used by the background extraction engine 506 includes modeling the background of the scene as a statistical model based on the relatively static pixels in previous frames which are not considered to belong to any moving region. For example, the background extraction engine 506 can use a Gaussian distribution model for each pixel location, with parameters of mean and variance to model each pixel location in a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. For example, if the distance of the pixel value and the Gaussian Mean is less than 3 times of the variance, the pixel is classified as a background pixel. Otherwise, the pixel is classified as a foreground pixel. At the same time, the Gaussian model will be updated by taking into consideration the current pixel value.

The background extraction engine 506 can also perform background extraction using a mixture of Gaussians (GMM). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N(X_t \mid \mu_{i,t}, \Sigma_{i,t})$$ Equation (1)

An equation of the GMM model is shown in equation (1), wherein there are K Gaussian models. Each Guassian model has a distribution with a mean of $\mu$ and variance of $\Sigma$, and has a weight $\omega$. Here, i is the index to the Gaussian model and t is the time instance. As shown by the equation, the parameters of the GMM changes over time after one frame (at time t) is processed.

The background extraction techniques mentioned above are based on the assumption that the camera is mounted still, and if anytime the camera is moved or orientation of the camera is changed, a new background model will need to be calculated. There are also background extraction methods that can handle foreground subtraction based on a moving background, including techniques such as tracking key points, optical flow, saliency, and other motion estimation based approaches.

Once a background model is generated using a statistical model (e.g., a Gaussian model) or a GMM, there are several ways to generate a background picture. In one video analytics solution, a background picture may be synthesized. In one example, a synthesis background picture is generated from the background model, and the pixel value of a synthesis background picture at time t will be the mean value of the Gaussian model built and updated through at time t for a given pixel location, regardless of whether the current pixel belongs to a background pixel or foreground pixel. Note that the same concept applies to other modeling methods (e.g., Gaussian mixture model), wherein a pixel value of a synthesis background picture will be the expectation of the model (e.g., the Gaussian mixture model).

In some embodiments, a background picture may be generated using different techniques than producing a synthetic background picture purely based on the expectation of a model (e.g., a Gaussian distribution model or a GMM), regardless of whether the pixel location is considered as a background or foreground pixel location. For example, the background picture produced from the video analytics engine 504 may be generated differently in a way that the background picture is closer to the current picture at time instance t. In one example, a background picture can be generated as a semi-synthesis background picture. For instance, at time t, values for background pixels and foreground pixels are generated differently. For a background pixel, instead of using the expectation of the model, the actual value of the pixel at time t is used. For a foreground pixel, however, the value is still produced as the expectation of the model (e.g., a Gaussian distribution model or a GMM), similarly as is done for synthesis background picture generation.

In another example, a similarity between a picture and a synthesis background picture is defined. In some examples, the similarity between a picture and a synthesis background picture can be defined by the number of background pixels in a picture. When the similarity between the current picture at time t and the synthesis background picture is within a threshold, the background picture is set to be the current picture (as opposed to a synthesis background picture). The threshold can include a certain number of similar pixels or a certain percentage of similar pixels. If a difference in the current picture at time t and the synthesis picture is larger than a threshold, other pictures before time t may be considered and one of the other pictures can be chosen to be the background picture. In some examples, when other pictures before time t are checked, the picture with the maximum number of background pixels (as compared to other pictures that are checked) may be chosen to be the background picture. The background picture that is chosen using such a technique can be referred to as a non-synthesis background picture.

Depending on a judgement from the video analytics engine 504 or even depending on rate distortions, any one of the synthesis background picture, semi-synthesis background picture, and non-synthesis background picture may be coded as the current active background picture. For example, the video analytics engine 504 can send a command to the encoding device 510 indicating which type of background picture to use (synthesis, semi-synthesis background picture, or non-synthesis background picture).

The information provided by video analytics engine 504 may be used by the encoding device 510 to benefit the video encoding process. For example, information extracted by the video analytics engine 504 may be fed into the encoding device 510 to adjust parameters of the encoding device 510. This way, in cases in which system 500 is part of a video surveillance system, cross module optimization can be achieved at the edge device of the video surveillance system, with the two relevant modules being the video analytics engine 504 and the video encoding device 510. In some examples, the background pictures 508 generated by the background extraction engine 506 can be fed into the video encoding device 510. The background pictures 508 can include a synthesis background picture, a semi-synthesis background picture, and/or a non-synthesis background picture.

The video encoding device 510 can be similar to and perform the same functions as the encoding device 104 described with respect to FIG. 1. In some embodiments, although the video analytics engine 504 is shown in FIG. 1 as producing the one or more background pictures 508 prior to video encoding, the video encoding device 510 does not have to wait for the video analytics to finish all processes (including background extraction) before the video encoding device 510 can start the encoding process. For instance, some high complexity features provided by the video analytics do not need to be accomplished to start the encoding process. In some examples, the video analytics engine 504 can start modeling a background picture once the device comprising the video analytics engine 504 (e.g., a camera) is setup to work. For example, the background picture may begin being modeled and may be generated before the video starts to be encoded and in some examples before the video starts to be streamed. In some examples, such a process of modeling a background picture can finish even after the video has started to be encoded by the video encoding device 510. In such examples, whenever determined to be ready, the background picture can be fed to the video encoding device 510 from the video analytics engine 504. With the information from the video analytics engine 504, a coded video bitstream can be stored in storage device 512 or transmitted to a decoding device, a Network Video Recorder (NVR) and/or to any other suitable device.

A new type of random access picture is described herein, and is referred to as a predictive random access (PRA) picture. The PRA picture can predictively depend on a background picture. In some examples, the encoding device 510 can use at least one of the background pictures 508 as a reference picture for coding a PRA picture. For example, the encoding device 510 can perform inter-prediction of the PRA picture using a background picture as a reference picture. In one example, the PRA picture can be compared with the background picture, and the residue or difference between the PRA picture and the background picture can be encoded using inter-prediction techniques. In some examples, a PRA picture can be coded using only inter-prediction based on a background picture. In some examples, both intra-prediction and inter-prediction (based on a background picture) are available to the encoding device 510 for coding a PRA picture. By encoding a PRA picture into the video bitstream, random access can be performed based on an inter-predictive PRA picture, instead of only performing random access starting from an intra-predicted (or intra-coded) slice or picture, as is the case under the current video coding standards (e.g., HEVC, AVC, extensions thereof, and other video coding standards). Such a PRA picture is different than an IDR or a CRA picture that may be a P-picture or a B-picture, as these IDR or CRA pictures must belong to a layer with layer ID greater than 0 and can only use inter-layer prediction from other pictures that belong to the same access unit as the IDR or CRA picture and that have a layer ID less than the layer containing the IDR or CRA picture. The PRA picture is different in that it can use inter-layer prediction from a background picture, which may not belong to the same access unit as the PRA picture.

Background pictures 508 can be stored in a buffer (e.g., a decoded picture buffer (DPB)) as reference pictures, and can be used for prediction of a PRA picture and, in some instances, other later decoded pictures (pictures that are later in decoding order). In some examples, the storage device 512 can be a DPB. The encoding device 510 can encode one or more PRA pictures into a video bitstream by performing inter-prediction of the one or more PRA pictures using one or more of the background pictures 508 as reference pictures. As explained in more detail below, a decoding device receiving the video bitstream can decode one or more of the PRA pictures using inter-prediction based on the one or more background pictures 508, which are also provided to the decoding device. For example, when receiving an encoded video bitstream and/or when performing random access, the decoding device can first decode the background picture and can then perform inter-prediction of a PRA picture using the decoded background picture.

Figure 6:
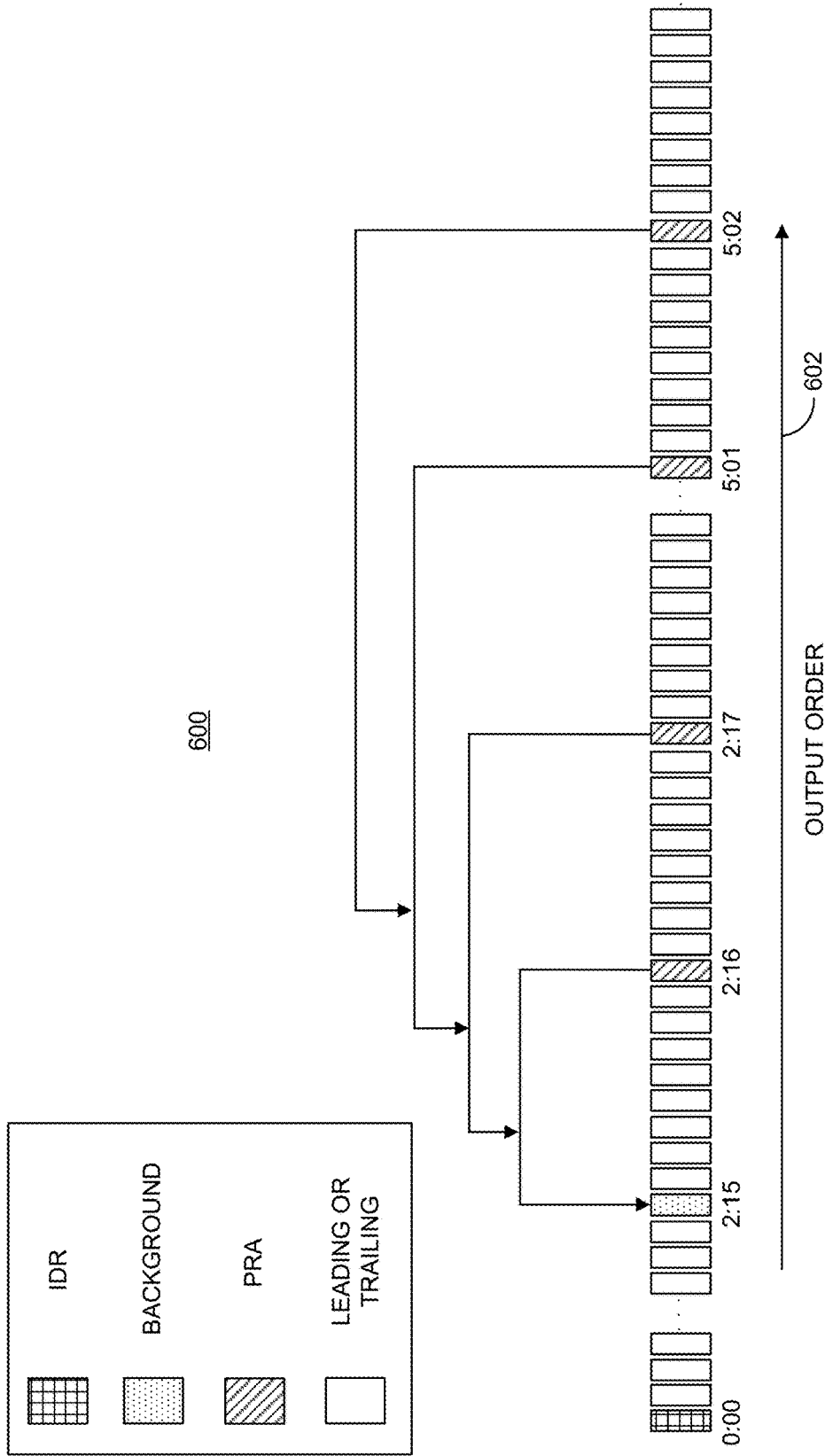
FIG. 6 is an example of pictures of an encoded video bitstream including background pictures and predictive random access pictures, in accordance with some embodiments.
Figure 7:
FIG. 7 is an example of a snapshot of a scene used in a simulation test, in accordance with some embodiments.
Figure 8:
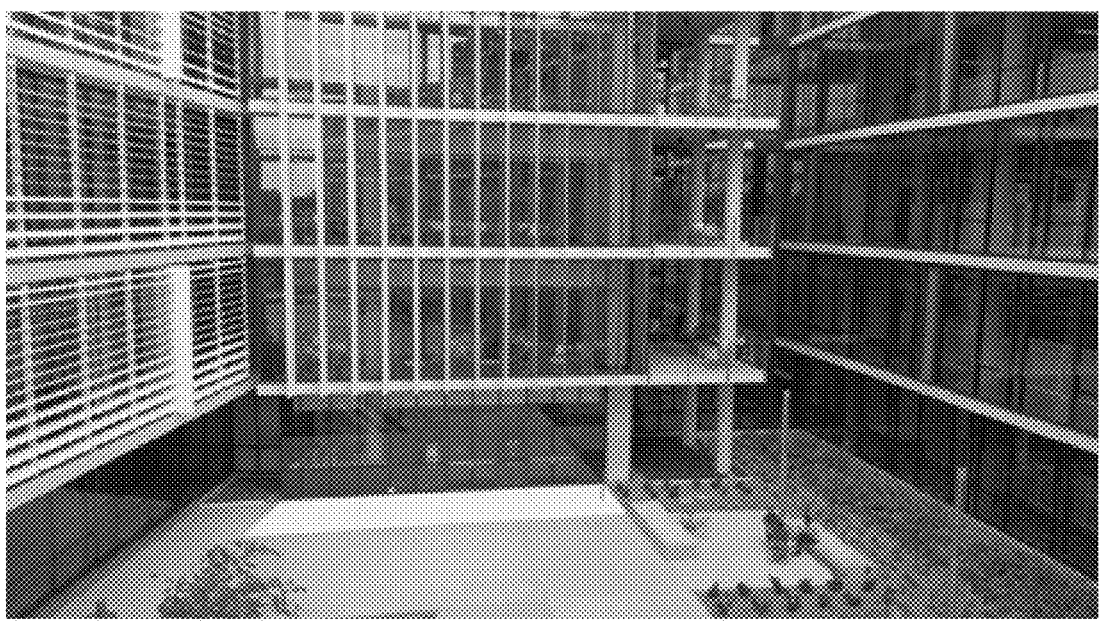
FIG. 8 is an example of a snapshot of a scene used in a simulation test, in accordance with some embodiments.
Figure 9:
FIG. 9 is an example of a snapshot of a scene used in a simulation test, in accordance with some embodiments.
Figure 10:
FIG. 10 is an example of a snapshot of a scene used in a simulation test, in accordance with some embodiments.

FIG. 6 illustrates a decoded video sequence 600 with PRA pictures. The pictures in the video sequence 600 are shown linearly in output order in the direction of the arrow 602, and various time stamps are shown in association with random access pictures, with the smallest unit being a second. The picture at time 0:00 is an IDR random access picture. At time 2:15, a background picture is inserted. Due to the presence of an active background picture at least until time 5:02, random access pictures subsequent to the background picture in time can be implemented as a P or a B picture (and does not have to be implemented as an I picture), predicted uniquely from the active background picture inserted at time 2:15 using inter-prediction. Such random access pictures are PRA pictures, and occur at times 2:16, 2:17, 5:01, and 5:02.

As previously described, a PRA picture is coded only by either inter-prediction using a background picture as reference or by intra-prediction. In some examples, the background picture generated through the background extraction process of the background extraction engine 506 is considered as active only in a certain period of time, and can be replaced by a new background picture. For example, a background picture can be replaced by a new or updated background picture every set period of time (e.g., after 30 seconds, after 1 minute, after 2 minutes, after 5 minutes, or after any other suitable period of time). In some examples, the new background picture may be automatically generated at each set period of time. In some examples, a new background picture may be generated when the background of a video sequence has changed by a certain amount (e.g., based on pixel values). In some embodiments, a given number of active background pictures can be maintained in the storage device 512. In one example, up to four background pictures can be maintained in a queue, which can be managed in a First-In-First-Out (FIFO) manner. One of ordinary skill will appreciate that any other suitable number of background pictures can be maintained.

A PRA picture is a picture that inter-predicts only from an active background picture. In some embodiments, pictures following the PRA picture in output order (or "display order") cannot refer to any picture prior to the PRA picture in decoding order except the active background picture. In some embodiments, there are two types of PRA pictures. A first PRA picture type is referred to as a predictive CRA (PCRA) picture. A PCRA picture allows the leading pictures of the PRA picture (pictures following PRA in decoding order but prior to PRA in output order) to be predicted further by other pictures (e.g., to use pictures decoded before the PCRA picture as reference), thus providing no constraint on the prediction structure. A second PRA picture type is referred to as a predictive IDR (PIDR) picture. A PIDR picture disallows the leading pictures of the PRA picture to be predicted from any picture prior to the PIDR picture, expect the active background picture. For example, the PIDR picture and any picture following the PIDR picture in decoding order cannot be dependent on any picture that comes before the PIDR picture in decoding order, except for the active background picture. In some instances, in the event there is no need to distinguish between these two types of PRA pictures, a PRA picture can be made to not enforce the constraints on the leading pictures. In such instances, the PRA picture would be a PCRA picture.

Background pictures are typically generated by video analytics (e.g., video analytics engine 504). However, in some instances, a picture captured by a capture device can be used as a background picture. In some embodiments, in applications when a capture device (e.g., a camera) may be turned on and off and is required to transmit captured video once the capture device is turned on, a background picture may be set using a default background picture produced as the first picture to be transmitted by the capture device. The background picture is then updated (e.g., another background picture is set as active) once the video analytics finishes the background extraction process and provides a newly updated background picture (e.g., a synthesis background picture, a semi-synthesis background picture, or a non-synthesis background picture generated using a Gaussian distribution model, a mixture of Gaussians (GMM), or other suitable background modeling and extraction technique).

In some embodiments, the encoding device 510 can compare a background picture produced by the background extraction engine 506 with the closest random access picture available in the DPB (e.g., IDR in case of H.264/AVC or IDR/CRA in case of H.265/HEVC). Based on the comparison, the encoding device 510 can determine if the closest random access picture is more efficient for encoding the current PRA picture, which may be any user defined measurement at the encoder side. For example, in terms of a rate distortion measurement perspective, the encoding device 510 can select the picture (the background picture or closest random access picture) that provides the better coding efficiency. Efficiency can be determined by the encoding device 510 using any suitable and known method. In one example, for each block of a picture, rate and distortion can be calculated, and can be added together (e.g., using the lambda function). In another example, the encoding device 510 can perform a picture-level decision. For instance, the encoding device 510 can perform two-pass encoding, where in the first pass the background picture is used to encode the current picture (e.g., the PRA picture) to see how good the coding is in terms of saving the bandwidth of the current picture (e.g., the coded picture size, or other factor). In the second pass, the closest random access picture can be used and the quality of the coding can be determined and compared to that using the background picture. One of ordinary skill in the art will appreciate that other methods of determining coding efficiency can be used. If the closest random access picture is more efficient for encoding the current PRA picture, the encoding device 510 can decide to use the random access picture to replace the background picture at the encoding device 510. The random access picture can then be used instead of the background picture (e.g., as the starting point). In such embodiments, the active background picture may in addition be transmitted to be the same as the coded random access picture.

In some embodiments, the encoding device 510 can compare a background picture produced by the video analytics engine 504 with the current active background picture. Based on the comparison, the encoding device 510 can determine if the current active background picture is more efficient for encoding the current PRA picture (e.g., using the same techniques described above for determining efficiency). If the current active background picture is more efficient for encoding the current PRA picture, the active background picture is kept unchanged. If the current active background picture is not more efficient for encoding the current PRA picture, the active background picture is changed to be the background picture produced by the video analytics engine 504.

A background picture may be coded in compliance with the current video coding standards (e.g., H.264/AVC, HEVC, extensions thereof, or other coding standards). For example, a background picture may be marked as a long-term reference picture. In addition, as explained in more detail below, an index to the background picture may be transmitted in a Supplemental Enhancement Information (SEI) message containing the background picture. For example, there may be multiple background pictures encoded into a video bitstream or provided separately from the bitstream. An index table, or other data structure, including index values can be used to map the background pictures to certain playout times of the decoded bitstream and/or to certain PRA pictures encoded into the video bitstream. In one example, random access may be performed at a time 3:30 in the video, which corresponds to a given PRA picture. The index table can be referred to in order to identify the closest background picture to the time 3:30, which is closest to the given PRA picture. The closest background picture can then be used to perform inter-prediction on the given PRA picture. Other example details are provided below.

A predictive random access (PRA) picture may also be coded in compliance with the current standards (e.g., H.264/AVC, HEVC, extensions thereof, or other coding standards). For example, the decoded picture buffer management can be done when decoding a PRA picture to perform random access. The buffer management can ensure that only the background picture is kept in the DPB when it is time for the PRA picture to be decoded. Other example details are provided below.

In some embodiments, new NAL unit types can be introduced to provide an indication of the background pictures and PRA pictures in a NAL unit header. In a new standard or in a new profile of a current standard (e.g., the HEVC standard or other standard), the background picture and PRA pictures would be better supported by making such an indication of the background picture and PRA pictures in a NAL unit header. New NAL unit types are introduced herein to provide such an indication. For example, a new NAL unit type may be assigned for a background picture, and can be named nalUnitTypeBg. A new NAL unit type may also be assigned for a PRA picture, and can be named nalUnitTypePra. One of ordinary skill in the art will appreciate that other names can be assigned the new NAL unit types for background pictures and PRA pictures.

As described above, an index to the background picture may be provided with the video bitstream (e.g., in an SEI message). In some embodiments, a portion of the NAL unit header (e.g., a fixed bit slot of the header) can be used to allocate an index idx of the background picture, and can be referred to as a syntax element nuh_bg_pic_idx. For example, the bits of the header can be renamed as the syntax element. The index can include certain bit values that refer to different background pictures and connect each background picture to one or more PRA pictures. For example, if the PRA picture utilizes a background picture with nuh_bg_pic_idx equal to idx for inter-prediction (during encoding), the nuh_bg_pic_idx in the NAL unit header of the PRA picture is also set to be idx (thus having the same index value). In one illustrative example, a first background picture can have an index value of 1, and second background picture can have an index value of 2. One or more PRA pictures that use the first background picture can also have the index value of 1 in the respective NAL unit header, and one or more PRA pictures that use the second background picture can have the index value of 2 in the respective NAL unit header.

Checking NAL unit type (or any part of the NAL unit header) is a lightweight process due to the design of the NAL unit header. Accordingly, by including a NAL unit type (background picture type or PRA picture type) as well as an index in the NAL unit headers of a background picture and a PRA picture, a decoding device or video player (or other video processing device) can easily connect a PRA picture to a corresponding background picture that can be used as reference for inter-prediction of the PRA picture. For example, a decoding device can check certain bits of the NAL unit header of a background picture or PRA picture to determine the type of picture (background or PRA) and the index value for the background or PRA picture. In one illustrative example, for a PRA picture with a NAL unit type equal to nalUnitTypePra (indicating the current picture is a PRA picture), if it is decided to do random access starting with the PRA picture, the associated index to the active background picture is found in the NAL unit header of the PRA picture. Using this value of the index, other NAL units can be checked in inverse decoding order (since occurrence of the PRA picture) to identify the active background picture which has both the NAL unit type equal to nalUnitTypeBg (or nalUnitTypePra) and the same index value.

A typical HEVC encoder may require certain modifications to generate the PRA pictures and support predictive random access. For example, once a background picture is received by the encoding device 510 from the video analytics engine 504, the background picture is encoded as an Intra-picture. The encoding device 510 can then mark the background picture as a long-term reference picture. In an alternative embodiment, the background picture can be marked as a short-term reference picture. Furthermore, when there is a need to insert a random access picture, and a background picture is available, a PRA picture can be generated (instead of another type of random access picture, such as an IDR, CRA, or BLA picture). When generating the PRA picture, each of the reference picture lists for the PRA picture can contain only the background picture.

In some embodiments, the encoding device 510 may assign the PRA picture a different picture order count (POC) least significant bit (LSB) as that of the background picture. Similarly, and optionally, the other pictures following the PRA picture may also have a POC LSB different from that of the background picture until the most significant bit (MSB) of a current picture has been increased by one or two (or other suitable number) compared with the initial value. Such a POC assignment scheme is desirable so that a background picture can be uniquely identified in the DPB after the PRA picture and any pictures following the PRA picture are decoded.

In some instances, a background picture may not be desirable for output. In such instances, a pic_output_flag syntax element of a slice of a background picture can be set equal to 0. By include a 0 value for the pic_output_flag syntax element, a decoder or player will not output the backgroundpicture.

Based on the description above, a background picture based encoding scheme has been introduced, in which a new predictive random access (PRA) picture that predictively depends on a background picture is described. On the decoder system level, changes must be made to enable the new kind of random access. For example, using existing methods of random access, a decoder starts decoding with a single picture due to the random access being performed using intra-pictures. However, using the background picture based encoding scheme described above, a background picture is used in addition to the PRA picture, so a decoder must access at least two pictures (the PRA picture and the background picture) to perform random access.

Various problems arise from the decoder and player perspective when introducing the background picture based encoding scheme and random access using PRA pictures. For example, it is not clear how to perform random access based on the PRA pictures from the application perspective, such as how the file format can recognize the background pictures and PRA pictures and how a player can make use of the background and PRA pictures for random access. In some instances, when processing the raw bitstreams, it is unclear which pictures are background pictures and which pictures are the PRA pictures that could be used for random access, because no new NAL unit types can be assigned to those pictures in a way that is compatible to the current HEVC (version 1) standard. Furthermore, if bitstreams with background pictures and PRA pictures are encapsulated in a file format container, it is not clear to the file format coder to know which of the pictures are background pictures and PRA pictures. While it is may be possible for an application to interact with both the encoder and the file format coder to collect such information, it might not be optimal for some implementations. Furthermore, it is not clear from the file format and therefore the player perspective on how to invoke the random access behavior based on a background and a PRA picture.

Another problem that may exist is that, when a PRA picture is used for random access, pictures following the PRA in decoding order but prior to the PRA in display order may not be correctly decoded. Such pictures can be referred to as PRA leading pictures. Some of the PRA leading pictures may be decodable even when the random access is performed based on the associated PRA, in a way similar to RADL pictures as defined in HEVC. Further, some of the PRA leading pictures may not be decodable when the random access is performed based on the associated PRA, in a way similar to RASL pictures as defined in HEVC. There is no way to indicate such leading pictures to a decoder or player.

Systems and methods are described for performing random access based on a background picture and the predictive random access picture, including techniques of how to perform such random access both in the bitstream level and transport/application level. Various examples of how to enable random access behaviour based on the background pictures and PRA pictures are provided.

In some embodiments, only one background picture can be required to decode any picture of a coded video sequence. Such a mechanism provides for fast and easy random access to be performed based on a background picture and a PRA picture. For example, any set of pictures (e.g., a sub-bitstream) that starts from a PRA picture and includes all the pictures following the PRA picture in display order can be playable depending only on one background picture. In such embodiments, a background picture is only effective until a next background picture (e.g., an updated background picture) is present in the bitstream or sub-bitstream. A current background picture can be discarded (e.g., from a DPB) when a next background picture is present in the bitstream or sub-bitstream. In some alternative embodiments, more than one background picture can be used to predict a PRA picture and pictures following the background picture. For example, the PRA picture can be a P-picture or a B-picture.

In some embodiments, a decoding device may perform a certain process for random access. For example, based on a desired time instance, a PRA picture with a closest time stamp to the desired time is identified. Once the PRA picture is identified, a background picture that is associated with the PRA picture is identified. For example, a background picture that is prior to the PRA picture in decoding order and that has a closest time stamp to the time stamp of the PRA picture is identified as the associated background picture. With the identified PRA picture and associated background picture, as well as pictures following the PRA picture in output order (or "display order"), the sub-bitstream starting with the background picture, the PRA picture, and the pictures following the PRA picture in output order can be decoded and used for continuous playback. Such a process allows successful random access to be performed. In one alternative, the sub-bitstream may contain the identified background picture, the PRA picture, and pictures following the PRA picture in decoding order. Accordingly, a video decoder can take a video clip (e.g., a sub-bitstream), which contains an active background (coded) picture, the PRA picture, and the coded pictures following the PRA picture in decoding order until a certain time. As long as the active background picture and the PRA picture are correctly placed in the bitstream, a legacy device (e.g., a normal H.264/AVC or HEVC decoder) can decode the video clip and output correctly the PRA picture and any picture following the PRA in output order, inclusive.

A media player may perform a similar process. For example, upon receiving a request for random access to a given time instance, the player may identify a PRA picture with the closest timestamp. A background picture prior to the PRA picture and with a timestamp closest to that of the PRA picture is identified. Playback can then start with the background picture, immediately followed by the PRA picture and other pictures following the PRA pictures. Among those pictures following a PRA picture, if a picture has an is_leading value equal to 1 (in an ISO base media format file) and a composition times (CT) smaller than that of the PRA, the picture may be skipped for decoding. The decoder and player process may be performed when the majority of random access points are PRA pictures, or when a bitstream contains both PRA and other types of random access pictures (e.g., CRA pictures) by treating the PRA picture equally as a CRA picture and additionally identifying the associated background picture when the random access point is a PRA picture.

Conventional random access pictures (e.g., IDR, CRA, or BLA pictures) can trigger immediate decoding if pictures of a current access unit (e.g., all NAL units of a same time instance) and the pictures of access units following the current access unit (in decoding order) are available. However, unlike conventional random access pictures, at the system level, care has to be taken if random access allows video playback to start from a PRA picture. For example, the coding system has to provide not only PRA picture and the pictures following the PRA picture in decoding and output order, but also must provide the active background picture associated with the PRA for use in performing inter-prediction.

In some embodiments, a real-time transport protocol (RTP) can be used. In an RTP scenario, in order for a client device to start a real-time session from video with PRA pictures, a next PRA picture is to be identified. The parameter sets, a background picture associated with the PRA picture, and the PRA picture itself altogether can be transmitted in order to start the session. In some embodiments, if RTP is used in the system, some data (either user defined or standard) can be present in the payload to specify the timestamp of the background picture if the current RTP package or packet contains a PRA picture. Such information may be present in a Payload Content Information (PACT) carrying an RTP packet. For example, a PACI carrying an RTP packet may contain an RTP payload header, a Payload Header Extension Structure (PHES), and a PACI payload.

In some embodiments, an ISO base media format or any of the ISO extensions or derivations can be used. Various techniques can be used for ISO-based file formats to provide the PRA picture, the pictures following the PRA picture, and also the active background picture associated with the PRA. The techniques can be performed individually or in combination. In one example, the reference between the PRA picture and the associated, active background picture can be signaled so that the decoder or player device can determine which background picture or pictures to use for decoding and playing back a PRA picture and pictures following the PRA picture in decoding and output order. In another example, the indication of the random access pictures can be changed to also include a PRA type in addition to the other types, such as IDR or CRA types. In another example, all background pictures may be put within one track of the ISO base media format file, and the PRA pictures (and in some instances other types of pictures) may be put in a different track. A track reference from the PRA picture track to the background picture track can be signaled. In another example, timed media information may be associated with both the PRA pictures and the background pictures, such that each PRA picture knows which background picture is to be used as reference for inter-prediction. Further, a unique index can be assigned to each of the background pictures. The index value assigned to a background picture can be signaled (as described above), for example, together with the background picture sample. A PRA picture can identify the active background picture associated with the PRA picture through an index associated with the PRA picture. For example, the index can be signaled with the PRA picture sample.

In some embodiments, an SEI message can be associated with a background picture, and may indicate that the background picture is of a background picture type. For example, the SEI message can be transmitted in a NAL unit (e.g., a non-VCL NAL unit) preceding or following a NAL unit containing at least a portion of the background picture. The NAL unit with the SEI message and the NAL unit containing at least the portion of the background picture may be part of the same access unit. Another SEI message (with the same or different type) can be associated with a PRA picture, indicating that the PRA picture is of a PRA picture type. For example, the SEI message can be transmitted in a NAL unit (e.g., a non-VCL NAL unit) preceding or following a NAL unit containing at least a portion of the PRA picture. The NAL unit with the SEI message and the NAL unit containing at least the portion of the PRA picture may be part of the same access unit. In some embodiment, the SEI message for a current background picture may persist for all subsequent PRA pictures until a new background picture becomes active and replaces the current background picture.

In some embodiments, based on either the information from the SEI messages, or information from the encoding device, the background pictures and the PRA pictures can be signaled in file format. Therefore, a PRA picture can always be assumed to be associated with one and only one unique background picture. The association can be done by checking the timestamps. For example, a decoder or player can check a timestamp of a PRA picture, and can then find a background picture preceding the PRA picture with a time stamp closest to the PRA picture timestamp, as described previously. In an alternative embodiment, the PRA pictures and background pictures can be identified and associated with one another by signaling the pictures with new random access point types (e.g., a background picture type and a PRA picture type) that are different from other types of random access. The type can be signaled in an SEI message, in a NAL unit header, or using any other suitable technique.

In some embodiments, an SEI message may be used to indicate the leading pictures associated with a PRA picture (pictures following the PRA picture in decoding order and preceding the predictive random access picture in output order). For example, an SEI message may include an indication of a predictive random access decodable (PRADL) picture and an indication of a predictive random access skipping (PRASL) picture. In an HEVC extension or new standard, new NAL unit types may be assigned to those pictures to indicate the type of leading pictures to a decoder and/or player. Using the SEI message and/or NAL unit type, a decoder can differentiate between PRA leading pictures that can be decodable even when the random access is performed based on the associated PRA (PRADL pictures) and PRA leading pictures that are not decodable when the random access is performed based on the associated PRA (PRASL pictures).

By using the techniques above to enable the use of inter-prediction of a random access picture using a background picture as reference, the amount of information needed for transmission to a client device is minimal, since the background portion of a picture stays fairly static while only a small amount of pixel data in the foreground of the picture is actually changing from frame to frame. In some examples, only portions of pictures that include moving objects (e.g., the foreground pixels) are encoded. The static background portions of the pictures do not have to be encoded for each picture, since the background can be relatively static for many pictures in a video sequence. In such examples, an active background reference picture containing the static background portion can be used for inter-predicting multiple encoded frames, until a new background picture is made active. By enabling a random access picture to be encoded as an inter-predicted picture, a large amount of bandwidth is saved, including as much as 50%, as compared to only allowing the random access picture to be coded using intra-prediction.

Various examples are now provided with further explanation of the various aspects described above. The examples are provided with reference to changes to the current HEVC standard, with changes to the standard provided in italicized and underlined text.

An HEVC extension or a new standard may be made which includes the support of a PRA picture. Small optimizations can be done to help support PRA picture-based random access, such as reference picture marking, reference picture list construction, and conformance point indications. In addition, other changes can be made or added to the HEVC standard.

An important aspect of providing random access using PRA pictures is the signaling of the PRA and background pictures (e.g., in a NAL unit header or other indication). In one example, the current HEVC standard is taken as a basis for a proposed NAL unit header design and the design changes are shown with additions in italicized and underlined text and deletions with:

NAL Unit Header Syntax

|  | Descriptor |
|---|---|
| nal_unit_header( ) { |  |
|   forbidden_zero_bit | f(1) |
|   nal_unit_type | u(6) |
|   *if( nal_unit_type !=* |  |
|   *nalUnitTypeBg && nal_unit_type!=* |  |
|   *nalUnitTypePra)* |  |
|     nuh_layer_id | u(6) |
|   *else* |  |
|     *nuh_bg_pic_idx* | *u(6)* |
|   nuh_temporal_id_plus1 | u(3) |
| } |  |

NAL Unit Header Semantics nuh_bg_pic_idx specifies the index to an active background picture. When the nal_unit_type is equal to nalUnitTypeBg (the current picture is a background picture), it is the index of the current picture. When the nal_unit_type is equal to nalUnitTypePra (the current picture is a PRA picture), it is the index of the active background picture this picture may be inter predicted from.

When the current picture is a background picture or a PRA picture, the value of nuh_layer_id is inferred to be equal to 0.

When decoding a current PRA picture, the value of its nuh_bg_pic_idx will be used to indentify the active background picture needed to decode the PRA picture.

In some examples, a new SEI message design (as described above) is introduced. The current HEVC standard is taken as a basis for a proposed SEI message design for background and PRA pictures. The design changes are shown with additions in italicized and underlined text and deletions with:

|  | Descriptor |
|---|---|
| sei_payload( payloadType, payloadSize ) { |  |
|   if( nal_unit_type = = PREFIX_SEI_NUT ) |  |
|     if( payloadType = = 0 ) |  |
|       buffering_period( payloadSize ) |  |
|     else if( payloadType = = 1 ) |  |
|       pic_timing( payloadSize ) |  |
|     else if( payloadType = = 2 ) |  |
|       pan_scan_rect( payloadSize ) |  |
|     else if( payloadType = = 3 ) |  |
|       filler_payload( payloadSize ) |  |
|     else if( payloadType = = 4 ) |  |
|       user_data_registered_itu_t_t35( payloadSize ) |  |
|     else if( payloadType = = 5 ) |  |
|       user_data_unregistered( payloadSize ) |  |
|     else if( payloadType = = 6 ) |  |
|       recovery_point( payloadSize ) |  |
|     else if( payloadType = = 9 ) |  |
|       scene_info( payloadSize ) |  |
|     else if( payloadType = = 15 ) |  |
|       picture_snapshot( payloadSize ) |  |
|     else if( payloadType = = 16 ) |  |
|       progressive_refinement_segment_start( payloadSize ) |  |
|     else if( payloadType = = 17 ) |  |
|       progressive_refinement_segment_end( payloadSize ) |  |
|     else if( payloadType = = 19 ) |  |
|       film_grain_characteristics( payloadSize ) |  |
|     else if( payloadType = = 22 ) |  |
|       post_filter_hint( payloadSize ) |  |
|     else if( payloadType = = 23 ) |  |
|       tone_mapping_info( payloadSize ) |  |

-continued

| | Descriptor |
|---|---|
|     else if( payloadType = = 45 )<br>        frame_packing_arrangement( payloadSize )<br>    else if( payloadType = = 47 )<br>        display_orientation( payloadSize )<br>    *else if( payloadType ==48)*<br>        *bg_random_access_info (payloadsize)*<br>    else if( payloadType = = 128 )<br>        structure_of_pictures_info( payloadSize )<br>...<br>    else<br>        reserved_sei_message( payloadSize )<br>else /* nal_unit_type = = SUFFIX_SEI_NUT */<br>    if( payloadType = = 3 )<br>...<br>        decoded_picture_hash( payloadSize )<br>    else<br>        reserved_sei_message( payloadSize )<br>if( more_data_in_payload( ) ) {<br>    if( payload_extension_present( ) )<br>        reserved_payload_extension_data<br>    payload_bit_equal_to_one /* equal to 1 */<br>    while( !byte_aligned( ) )<br>        payload_bit_equal_to_zero /* equal to 0 */<br>    }<br>} | <br><br><br><br><br><br><br><br><br><br><br><br><br><br><br><br><br><br><br><br>u(v)<br>f(1)<br><br>f(1) |

Alternatively, the SEI message could be any value instead of 48. Alternatively, the SEI message could be user defined.

Further changes to the current HEVC standard (additions shown in italicized and underlined text and deletions shown with) for the SEI message design for background and PRA pictures are as follows:

Background Picture Based Random Access Point SEI Message Syntax

| | Descriptor |
|---|---|
| bg_random_access_info( payloadSize ) {<br>    *reserved_1_bit*<br>    *bg_ra_picture_type_flag*<br>} | <br>*u(1)*<br>*u(1)* |

Background Picture Based Random Access Point SEI Message Semantics

The background picture based random access point SEI message assists a decoder in determining whether the associated picture is a background picture or a predictive random access picture.

This message shall only be present if the associated picture is either a background picture or a predictive randoma access picture. When this message is not present, the current picture may not be a background picture or predictive random access picture.

bg_ra_picture_type_flag equal to 0 indicates the current picture is a background picture, bg_ra_picture_type_flag equal to 1 indicates the current picture is a predictive random access picture.

It is a bitstream requirement that a background picture itself is an IRAP picture.

Alternatively, the background picture and PRA picture can be associated with different SEI messages (e.g., background picture SEI and PRA picture SEI, respectively).

Alternatively, the background picture can always be set to be the closest IRAP picture, therefore only the PRA pictures need to be associated with a SEI message (e.g., a PRA picture SEI message).

Alternatively, such an SEI message may be extended to further support signaling of PRADL or PRASL pictures, as described above, and as shown below (additions shown in italicized and underlined text and deletions shown with) as an addition to the current HEVC standard:

| | Descriptor |
|---|---|
| bg_random_access_info( payloadSize ) {<br>    *pra_picture_type_idc*<br>} | <br>*u(2)* | pra_picture_type_idc equal to 0 indicates the current picture is a background picture, pra_picture_type_idc equal to 1 indicates the current picture is a predictive random access picture.

pra_picture_type_idc equal to 2 indicates the current picture is a PRASL picture.

pra_picture_type_idc equal to 3 indicates the current picture is a PRADL picture.

If a picture is not a background, PRA, PRADL, or PRASL picture, the SEI message shall not be associated with the picture.

Alternatively, such an SEI message may be extended to indicate an index to the BG picture to each group of PRA pictures, as shown below (additions shown in italicized and underlined text and deletions shown with) as an addition to the current HEVC standard.

| | Descriptor |
|---|---|
| bg_random_access_info( payloadSize ) {<br>    *bg_idx*<br>    *pra_picture_type_idc*<br>} | <br>*u(8)*<br>*u(2)* | bg_idx indicates the index of the current background picture or the associated background picture of the current picture, when the current picture is not a background picture.

Alternatively, in addition, an index of the PRA picture may also be indicated, as shown below (additions shown in italicized and underlined text and deletions shown with) as an addition to the current HEVC standard:

| | Descriptor |
|---|---|
| bg_random_access_info( payloadSize ) {<br>    *bg_idx*<br>    *pra_picture_type_idc*<br>    *if(pra_picture_type_idc)*<br>        *pra_pic_idx*<br>} | <br>*u(8)*<br>*u(2)*<br><br>*u(32)* | pra_pic_idx indicates the index of the current PRA picture or the associated PRA picture of a current leading picture (either PRADL or PRASL), the PRA picture is associated with the background picture with index equal to bg_idx.

When decoding a PRA picture and it contains a picture in a reference picture set (RPS) that is not present in the bitstream, the decoding process for generating unavailable reference pictures as defined in sub-clause 8.3.3 of the HEVC standard ("Decoding process for generating unavailable reference pictures") may be used to produce the unavailable reference pictures.

A PRASL picture may not be decoded when random access is performed at the corresponding PRA picture. In one alternative, PRADL pictures may not be present and all leading pictures associated with a PRA picture are PRASL pictures. In some examples, a PRASL picture may be filtered at the system level and thus not fed into the decoder.

In another example, the current HEVC standard can be modified to introduce new NAL unit types, as described above. For example, in an HEVC extension (e.g., based on the HEVC version 1), PRA pictures, PRADL pictures, and PRASL pictures can be allocated with new NAL unit types (one for PRA, two for PRADL or PRASL pictures for reference and non-reference cases). In some cases, a PRA picture will follow a similar decoding behavior as CRA pictures and will treat the associated PRADL pictures and PRASL pictures similarly as CRA pictures treat the RADL and RASL pictures. In such cases, PRADL picture will follow a similar or the same decoding behavior as RADL pictures, and PRASL picture will follow a similar or the same decoding behavior as PRASL pictures.

In some examples, a new file format indication of PRA pictures and background pictures (as described above) is introduced. The current HEVC standard is taken as a basis for a proposed file format indication. Based on the latest HEVC specification (w15479), the following changes (additions shown in italicized and underlined text and deletions shown with) are proposed for the players to better make use of the PRA pictures:

3.2 Abbreviated Terms
BGP Background Picture
. . .
PPS Picture Parameter Set
PRA Predictive Random Access
8.4.3 Sync Sample An HEVC sample is considered as a sync sample if the VCL NAL units in the sample indicate that the coded picture contained in the sample is an Instantaneous Decoding Refresh (IDR) picture, a Clean Random Access (CRA) picture, a Broken Link Access (BLA) picture, or a PRA picture.

When the sample entry name is 'hev1', the following applies:
  If the sample is a random access point, all parameter sets needed for decoding that sample shall be included either in the sample entry or in the sample itself.
  Otherwise (the sample is not a random access point), all parameter sets needed for decoding the sample shall be included either in the sample entry or in any of the samples since the previous random access point to the sample itself, inclusive.

For signalling of various types of random access points, the following guidelines are recommended:
  The sync sample table (and the equivalent flag in movie fragments) must be used in an HEVC track unless all samples are sync samples. Note that track fragment random access box refers to the presence of signalled sync samples in a movie fragment.
  The 'roll' sample group is recommended to be used only for gradual decoding refresh (GDR) based random access points, i.e. those that contain non-intra coded slices.
  The use of the 'rap' or 'sync' sample group is optional, depending on the need of either the information on leading samples associated with the random access points or the picture types (e.g. IDR, CRA, BLA or associated with a background picture based random access point SEI) of the random access points.
  The use of the Alternative Startup Sequences (ISO/IEC 14496-12 section 10.3) sample group is recommended to be used only with random access points consisting of CRA, BLA pictures and PRA pictures.

8.4.8 Definition of a Sub-Sample for HEVC

For the use of the sub-sample information box (8.7.7 of ISO/IEC 14496-12) in an HEVC stream, a sub-sample is defined on the basis of the value of the flags field of the sub-sample information box as specified below. The presence of this box is optional; however, if present in a track containing HEVC data, the 'codec_specific_parameters' field in the box shall have the semantics defined here.

flags specifies the type of sub-sample information given in this box as follows:
  0: NAL-unit-based sub-samples. A sub-sample contains one or more contiguous NAL units.
  1: Decoding-unit-based sub-samples. A sub-sample contains exactly one decoding unit.
  2: Tile-based sub-samples. A sub-sample either contains one tile and the associated non-VCL NAL units, if any, of the VCL NAL unit(s) containing the tile, or contains one or more non-VCL NAL units.
  3: CTU-row-based sub-samples. A sub-sample either contains one CTU row within a slice and the associated non-VCL NAL units, if any, of the VCL NAL unit(s) containing the CTU row or contains one or more non-VCL NAL units. This type of sub-sample information shall not be used when entropy_coding_sync_enabled_flag is equal to 0.
  4: Slice-based sub-samples. A sub-sample either contains one slice (where each slice may contain one or more slice segments, each of which is a NAL unit) and the associated non-VCL NAL units, if any, or contains one or more non-VCL NAL units.

Other values of flags are reserved.

The subsample_priority field shall be set to a value in accordance with the specification of this field in ISO/IEC 14496-12.

The discardable field shall be set to 1 only if this sample can still be decoded if this sub-sample is discarded (e.g. the sub-sample consists of an SEI NAL unit).

When the first byte of a NAL unit is included in a sub-sample, the preceding length field must also be included in the same sub-sample.

```
if (flags == 0) {
    unsigned int(1) SubLayerRefNalUnitFlag;
    unsigned int(1) RapNalUnitFlag;
    unsigned int(1) VclNalUnitFlag;
    unsigned int(29) reserved = 0;
} else if (flags == 1)
    unsigned int(32) reserved = 0;
else if (flags == 2) {
    unsigned int(2) vcl_idc;
    unsigned int(2) reserved = 0;
    unsigned int(4) log2_min_luma_ctb;
    unsigned int(12) ctb_x;
    unsigned int(12) ctb_y;
} else if (flags == 3 || flags == 4) {
    unsigned int(2) vcl_idc;
    unsigned int(30) reserved = 0;
}
```

SubLayerRefNalUnitFlag equal to 0 indicates that all NAL units in the sub-sample are VCL NAL units of a sub-layer non-reference picture as specified in ISO/IEC 23008-2. Value 1 indicates that all NAL units in the sub-sample are VCL NAL units of a sub-layer reference picture as specified in ISO/IEC 23008-2.

RapNalUnitFlag equal to 0 indicates that none of the NAL units in the sub-sample has nal_unit_type equal to IDR_W_RADL, IDR_N_LP, CRA_NUT, BLA_W_LP, BLA_W_RADL, BLA_N_LP, RSV_IRAP_VCL22, or RSV_IRAP_VCL23 as specified in ISO/IEC 23008-2 without the background picture based random access point SEI. Value 1 indicates that all NAL units in the sub-sample have nal_unit_type equal to IDR_W_RADL, IDR_N_LP, CRA_NUT, BLA_W_LP, BLA_W_RADL, BLA_N_LP, RSV_IRAP_VCL22, or RSV_IRAP_VCL23 or with an associated SEI message being the background picture based random access point SEI as specified in ISO/IEC 23008-2.

10.6 HEVC and LHEVC Tile Track 10.6.1 Introduction

There are cases where storing independently decodable HEVC (respectively LHEVC) tiles in different tracks may be useful for fast spatial and temporal access to the video content. For such cases, tracks may be created using HEVCTileSampleEntry (respectively LHEVCTileSampleEntry) sample description format.

An HEVC (respectively LHEHC) tile track is a video track for which there is a 'tbas' reference to the HEVC (respectively LHEVC) track carrying NALUs of the associated HEVC layer to which the tile(s) belong. The sample description type for an HEVC tile track shall be 'hvt1'. The sample description type for an LHEVC tile track shall be 'lht1'. Neither the samples in the tile track or the sample description box shall contain VPS, SPS or PPS NAL units, these NAL units shall be in the samples or in the sample description box of the track containing the associated layer, as identified by the 'tbas' track reference. Both the HEVC/LHEVC tile track and the track containing the associated layer, as indicated by the 'tbas' track reference, may use extractors, as defined in Annex B, to indicate how the original bitstream is reconstructed; presence of extractors in these tracks may be constrained in some application domains.

An HEVC or LHEVC sample stored in a tile track is a complete set of slices for one or more tiles, as defined in ISO/IEC 23008-2. Typically if the track consists of a single HEVC tile, only the slice(s) used to code this tile will be found in the sample. A tile track typically includes one TileRegionGroupEntry (single-tile track), or one TileSetGroupEntry and one or more dependent TileRegionGroupEntry this tile set is made of (multi-tile track).

An HEVC sample stored in a tile track is considered as a sync sample if the VCL NAL units in the sample indicate that the coded slices contained in the sample are Instantaneous Decoding Refresh (IDR) slices, Clean Random Access (CRA) slices, or Broken Link Access (BLA) slices or slices associated SEI message being the background picture based random access point SEI.

Alternatively, when a PRA picture is associated with a PRA picture SEI message, all the above changes may still apply by replacing "background picture based random access point SEI" with "PRA picture SEI".

In some examples, new file format changes are introduced to the ISO base media file format to implement random access using PRA pictures and background pictures (as described above). The ISO base media file format standard (ISO/IEC 14496-12) is taken as a basis for a proposed file format change. The following changes (additions shown in italicized and underlined text and deletions shown with) are proposed:

8.6.4.2. Syntax

```
aligned(8) class SampleDependencyTypeBox
    extends FullBox('sdtp', version = 0, 0) {
    for (i=0; i < sample_count; i++){
        unsigned int(2) is_leading;
        unsigned int(2) sample_depends_on;
        unsigned int(2) sample_is_depended_on;
        unsigned int(2) sample_has_redundancy;
    }
}
```

8.6.4.3. Semantics is_leading takes one of the following four values:
  0: the leading nature of this sample is unknown;
  1: this sample is a leading sample that has a dependency before the referenced I-picture or the PRA picture (and is therefore not decodable);
  2: this sample is not a leading sample;
  3: this sample is a leading sample that has no dependency before the referenced I-picture (and is therefore decodable);

sample_depends_on takes one of the following four values:
  0: the dependency of this sample is unknown;
  1: this sample does depend on others (not an I picture);
  2: this sample does not depend on others (I picture);
  3: reserved sample_is_depended on takes one of the following four values:
  0: the dependency of other samples on this sample is unknown;
  1: other samples may depend on this one (not disposable);
  2: no other sample depends on this one (disposable);
  3: reserved sample_has_redundancy takes one of the following four values:
  0: it is unknown whether there is redundant coding in this sample;
  1: there is redundant coding in this sample;
  2: there is no redundant coding in this sample;
  3: reserved Simulation results will now be described based on a preliminary implementation of one example using PRA done based on HM (the reference software of HEVC). The test was performed under common test condition with several example captured IPC sequences. Here the frequency of the PRA is set to the same as the frequency of the random access picture (IDR or CRA) in HM. Snapshots of four of the sequences are shown in FIG. 7-FIG. 10. The snapshot 700 is labeled Monitor_ay. The snapshot 800 is labeled Ay_street_level. The snapshot 900 is labeled Pacific. The snapshot 1000 is labeled Sorrento_view.

The db rate saving (following the JCTVC common test conditions for the sequences are listed below):

| Seq. | Bd rate saving |
| --- | --- |
| monitor_ay | −35.4% |
| ay_street_level | −27.3% |
| Pacific | −20.6% |
| sorrento_view | −30.7% |
| Average | −28.5% |

As a common practice in video coding, BD rate is calculated based on four QP points. A minus value indicates that assume the PSNR is the same, the proposed method can provide a bit-rate saving (averaging 28.5% in this case) compared to the anchor method (which is HM reference software encoder).

FIG. 11 illustrates an embodiment of a process 1100 of encoding video data. In some aspects, the process 1100 may be performed by a computing device or an apparatus, such as the encoding device 104 or the encoding device 510 shown in FIG. 1, FIG. 5, or in FIG. 13. For example, the computing device or apparatus may include an encoder, or a processor, microprocessor, microcomputer, or other component of an encoder that is configured to carry out the steps of process 1100. In some examples, the computing device or apparatus may include a camera configured to capture the video data. For example, the computing device may include a camera device (e.g., an IP camera or other type of camera device) that includes a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 1100 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 1102, the process 1100 of encoding video data comprises obtaining a background picture. The background picture is generated based on a plurality of pictures captured by an image sensor. The background picture is generated to include background portions identified in each of the captured pictures. In one illustrative example, the video analytics engine 504 (e.g., the background extraction engine 506) can generate the background picture using any of the techniques described herein. In some examples, the background picture includes a synthesis background picture generated using a statistical model (e.g., a Gaussian model or GMM). In some examples, the background picture includes a semi-synthesis background picture. Background pixels of the semi-synthesis background are determined from background pixel values of a current picture, and foreground pixels of the semi-synthesis background are determined from an expectation of a statistical model, as previously described. In some examples, the background picture includes a non-synthesis background picture. The non-synthesis background picture is set as a current picture when a similarity in pixel values between the current picture and a synthesis background picture is within a threshold, as previously described. In some examples when the background picture includes a non-synthesis background picture, the non-synthesis background picture is selected from one or more pictures occurring prior in time to a current picture when a similarity in pixel values between the current picture and a synthesis background picture is outside a threshold, as previously described.

At 1104, the process 1100 comprises encoding, into a video bitstream, a group of pictures captured by the image sensor. The group of pictures comprises at least one random access picture, and encoding the group of pictures comprises encoding at least a portion of the at least one random access picture using inter-prediction based on the background picture. In some examples, encoding at least the portion of the at least one random access picture using inter-prediction based on the background picture comprises predicting at least the portion of the at least one random access picture using the background picture as a reference picture. In some examples, the process 1100 includes encoding the background picture into the video bitstream. In some cases, the process 1100 includes encoding the background picture as a long-term reference picture. In some cases, the process 1100 includes encoding the background picture as a short term reference picture.

In some examples, the process 1100 includes encoding at least the portion of the at least one random access picture using inter-prediction based on the background picture when the background picture is determined to be available as a reference picture. For example, when there is a need to insert a random access picture into the video bitstream, and a background picture is available, a predictive random access picture can be generated instead of another type of random access picture, such as an IDR, CRA, or BLA picture.

In some examples, the process 1100 includes assigning a value of 0 to a picture output flag of the background picture. For instance, a background picture may not be desirable for output in some cases. In such instances, a pic_output_flag syntax element of a slice of a background picture can be set equal to 0.

In some examples, the process 1100 includes obtaining an updated background picture and replacing the background picture with the updated background picture. For example, the updated background picture can be designated as the active background picture. The process 1100 further includes encoding at least a portion of a random access picture using inter-prediction based on the updated background picture. In some aspects, the background picture is active for a period of time, and the updated background picture is obtained upon expiration of the period of time. For example, a background picture can be considered as active only in a certain period of time, and can be replaced by a new or updated background picture. In one illustrative example, a background picture can be replaced by a new or updated background picture every set period of time (e.g., after 1 minute, after 2 minutes, after 5 minutes, or after any other suitable period of time).

In some examples, the group of pictures further comprises at least one picture following the at least one random access picture in decoding order and preceding the at least one random access picture in output order, and the at least one random access picture allows the at least one picture to be predicted using one or more pictures preceding the at least one random access picture in decoding order. In such examples, the at least one random access picture can be referred to as a predictive CRA picture.

In some examples, the group of pictures further comprises at least one picture following the at least one random access picture in decoding order and preceding the at least one random access picture in output order, and the at least one random access picture disallows the at least one picture from being predicted using any picture preceding the at least one random access picture in decoding order except the background picture. In such examples, the at least one random access picture can be referred to as a predictive IDR picture.

In some examples, the group of pictures includes at least one network abstraction layer unit containing at least a portion of the at least one random access picture, and a header of the at least one network abstraction layer unit comprises a random access picture type indication assigned to network abstraction layer units of random access pictures encoded using inter-prediction based on one or more background pictures. For example, a NAL unit type may be assigned for PRA picture, and may be named nalUnitTypePra.

In some examples, the group of pictures includes at least one network abstraction layer unit containing at least a portion of the background picture, and a header of the at least one network abstraction layer unit comprises a background picture type indication. For example, a NAL unit type may be assigned for background picture, and may be namely nalUnitTypeBg.

FIG. 12 illustrates an embodiment of a process 1200 of decoding video data. In some aspects, the process 1200 may be performed by a computing device or an apparatus, such as the decoding device 112 shown in FIG. 1 or in FIG. 14 or a player device for playing video. For example, the computing device or apparatus may include a decoder, a player, or a processor, microprocessor, microcomputer, or other component of a decoder or player that is configured to carry out the steps of process 1200.

Process 1200 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 1202, the process 1200 of decoding video data comprises obtaining an encoded video bitstream comprising a plurality of pictures. The plurality of pictures comprise a plurality of predictive random access pictures. A predictive random access picture is at least partially encoded using inter-prediction based on at least one background picture. In one illustrative example, the video analytics engine 504 (e.g., the background extraction engine 506) can generate the background picture using any of the techniques described herein. In some examples, the background picture includes a synthesis background picture generated using a statistical model (e.g., a Gaussian model or GMM). In some examples, the background picture includes a semi-synthesis background picture. Background pixels of the semi-synthesis background are determined from background pixel values of a current picture, and foreground pixels of the semi-synthesis background are determined from an expectation of a statistical model, as previously described. In some examples, the background picture includes a non-synthesis background picture. The non-synthesis background picture is set as a current picture when a similarity in pixel values between the current picture and a synthesis background picture is within a threshold, as previously described. In some examples when the background picture includes a non-synthesis background picture, the non-synthesis background picture is selected from one or more pictures occurring prior in time to a current picture when a similarity in pixel values between the current picture and a synthesis background picture is outside a threshold, as previously described.

At 1204, the process 1200 comprises determining, for a time instance of the video bitstream, a predictive random access picture of the plurality of predictive random access pictures with a time stamp closest in time to the time instance. At 1206, the process 1200 comprises determining a background picture associated with the predictive random access picture. In some examples, the background picture associated with the predictive random access picture precedes the predictive random access picture in decoding order and has a time stamp closest in time to the time stamp of the predictive random access picture.

At 1208, the process 1200 comprises decoding at least a portion of the predictive random access picture using inter-prediction based on the background picture.

In some examples, the process 1200 includes receiving a message indicating that the predictive random access picture is of a predictive random access type. In some examples, the process 1200 includes receiving a message indicating that the background picture is of a background picture type. The messages can include one or more SEI messages. For example, the background picture and PRA picture can be associated with the same SEI message. In another example, the background picture and PRA picture can be associated with different SEI messages (e.g., background picture SEI and PRA picture SEI, respectively).

In some examples, the plurality of pictures further comprises at least one picture following the predictive random access picture in decoding order and preceding the predictive random access picture in output order, and the at least one picture includes a message indicating that the at least one picture is associated with the predictive random access picture. The message can include an SEI message. In some aspects, the at least one picture includes a predictive random access decodable leading picture. In some aspects, the at least one picture includes a predictive random access skipped leading picture.

In some examples, decoding at least the portion of the predictive random access picture using inter-prediction based on the background picture comprises predicting at least the portion of the predictive random access picture using the background picture as a reference picture.

In some examples, the background picture is encoded into the video bitstream. In some aspects, the background picture is encoded as a long-term reference picture. In some aspects, the background picture is encoded as a short term reference picture.

In some examples, the plurality of pictures include at least one network abstraction layer unit containing at least a portion of the predictive random access picture, and a header of the at least one network abstraction layer unit comprises a predictive random access picture type indication assigned to network abstraction layer units of random access pictures encoded using inter-prediction based on one or more background pictures. For example, a NAL unit type may be assigned for PRA picture, and may be named nalUnitTypePra.

In some examples, wherein the plurality of pictures include at least one network abstraction layer unit containing at least a portion of the background picture, wherein a header of the at least one network abstraction layer unit comprises a background picture type indication. For example, a NAL unit type may be assigned for background picture, and may be namely nalUnitTypeBg.

The coding techniques discussed herein may be implemented in an example video encoding and decoding system (e.g., system 100). A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 13:
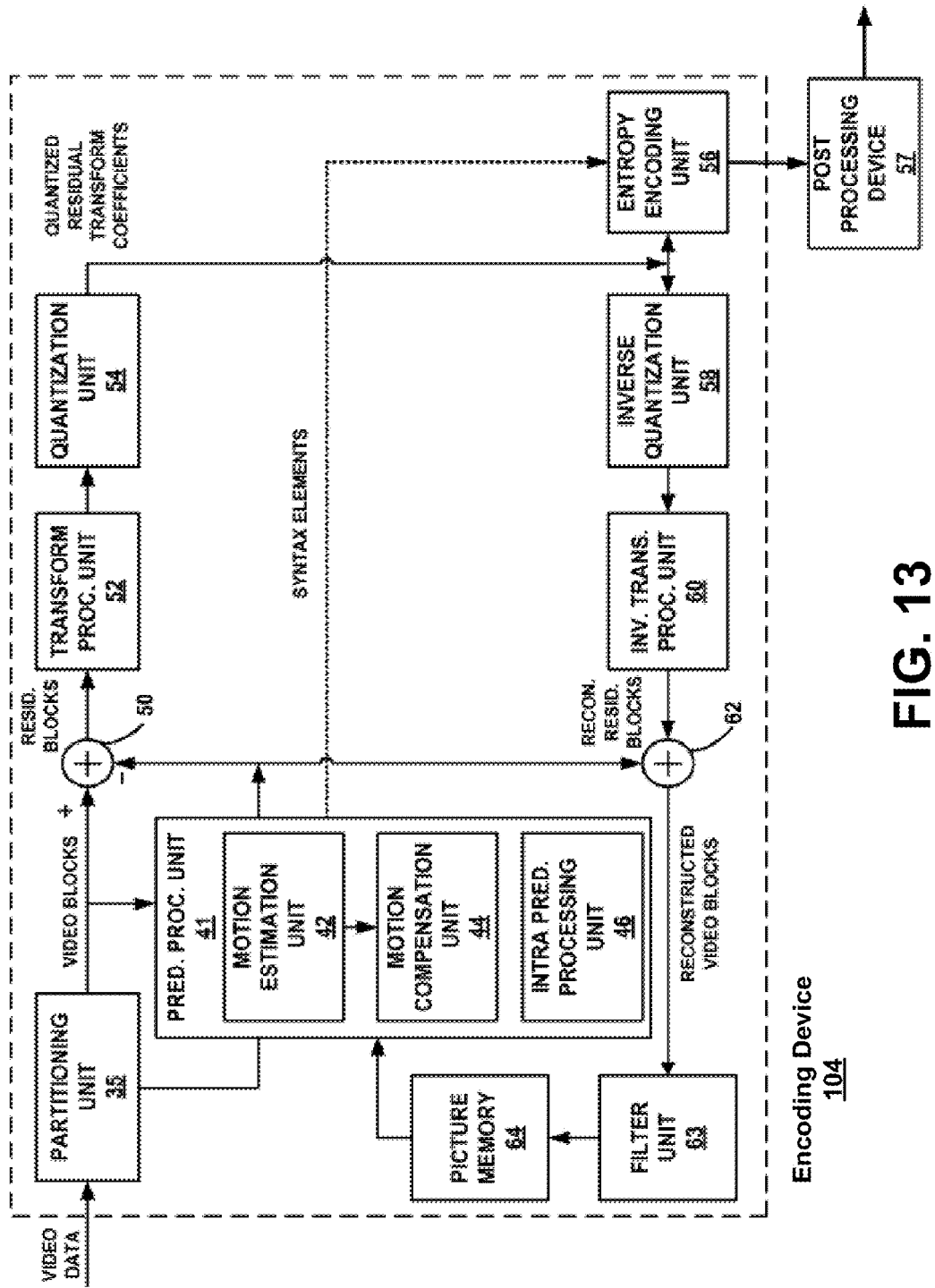
FIG. 13 is a block diagram illustrating an example video encoding device, in accordance with some embodiments.
Figure 14:
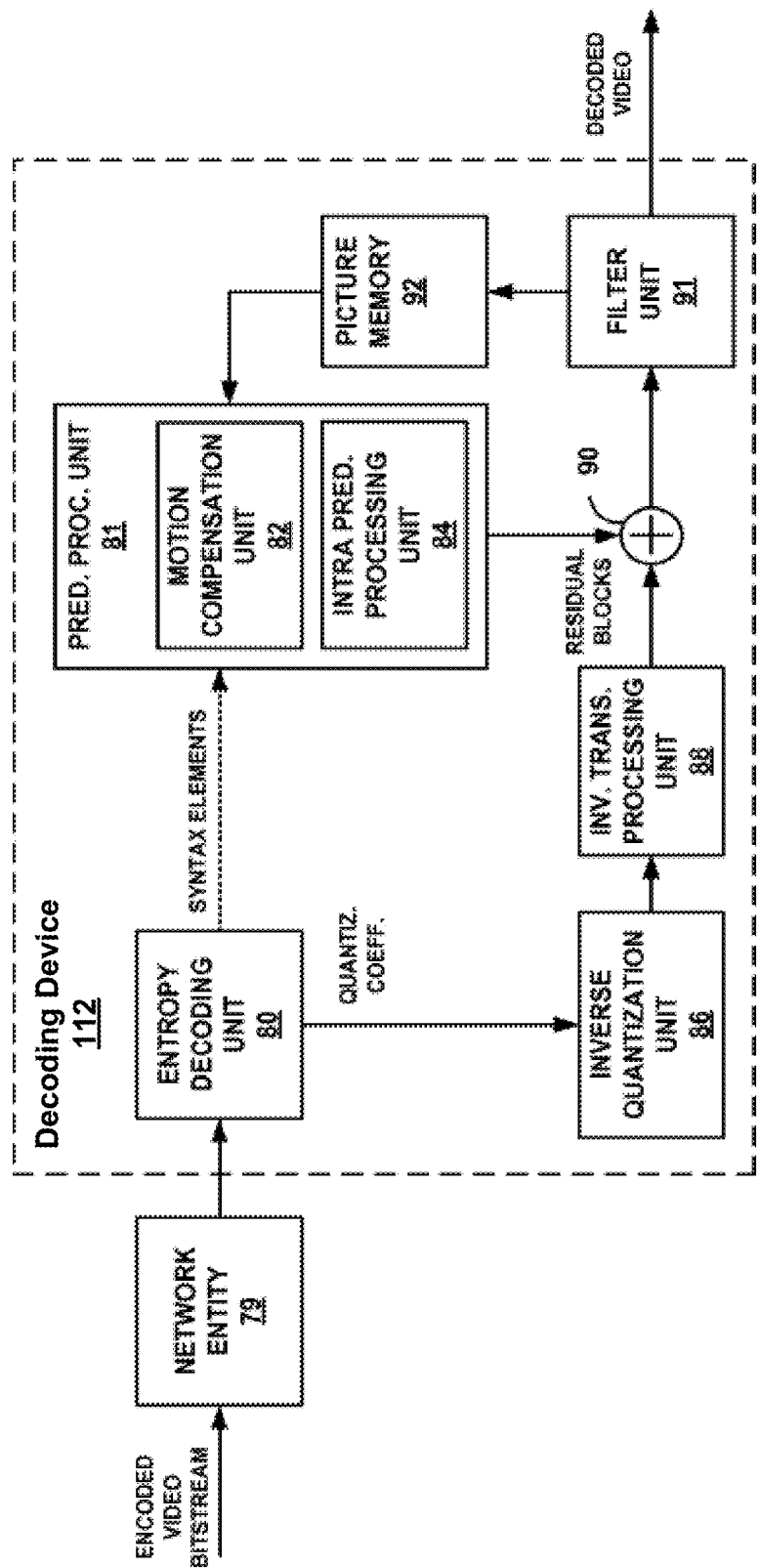
FIG. 14 is a block diagram illustrating an example video decoding device, in accordance with some embodiments.

Specific details of the encoding device 104 and the decoding device 112 are shown in FIG. 13 and FIG. 14, respectively. FIG. 13 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 13 as being an in loop filter, in other configurations, filter unit 63 may be implemented as a post loop filter. A post processing device 57 may perform additional processing on encoded video data generated by encoding device 104. The techniques of this disclosure may in some instances be implemented by encoding device 104. In other instances, however, one or more of the techniques of this disclosure may be implemented by post processing device 57.

As shown in FIG. 13, encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. Encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, encoding device 104 may calculate values for sub-integer pixel positions of reference pictures stored in picture memory 64. For example, encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. Encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to decoding device 112, or archived for later transmission or retrieval by decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, encoding device 104 of FIG. 13 represents an example of a video encoder configured to generate syntax for a encoded video bitstream. Encoding device 104 may, for example, generate VPS, SPS, and PPS parameter sets as described above. The encoding device 104 may perform any of the techniques described herein, including the processes described above with respect to FIG. 6 and FIG. 7. The techniques of this disclosure have generally been described with respect to encoding device 104, but as mentioned above, some of the techniques of this disclosure may also be implemented by post processing device 57.

FIG. 14 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. Decoding device 112 may, in some examples, perform a decoding pass generally reciprocal to the encoding pass described with respect to encoding device 104 from FIG. 13.

During the decoding process, decoding device 112 receives an encoded video bitstream that represents video blocks of an encoded video slice and associated syntax elements sent by encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include encoding device 104. Some of the techniques described in this disclosure may be implemented by network entity 79 prior to network entity 79 transmitting the encoded video bitstream to decoding device 112. In some video decoding systems, network entity 79 and decoding device 112 may be parts of separate devices, while in other instances, the functionality described with respect to network entity 79 may be performed by the same device that comprises decoding device 112.

The entropy decoding unit 80 of decoding device 112 entropy decodes the bitstream to generate quantized coefficients, motion vectors, and other syntax elements. Entropy decoding unit 80 forwards the motion vectors and other syntax elements to prediction processing unit 81. Decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. Decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by encoding device 104 during encoding of the video blocks to calculate interpolated values for sub-integer pixels of reference blocks. In this case, motion compensation unit 82 may determine the interpolation filters used by encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 14 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of decoding video data, the method comprising:
    obtaining an encoded video bitstream comprising a plurality of pictures, wherein the plurality of pictures comprise a plurality of predictive random access pictures, and wherein a predictive random access picture is at least partially encoded using inter-prediction based on at least one background picture, wherein the at least one background picture is generated to include one or more background portions identified in each of a plurality of captured pictures, and wherein the at least one background picture is generated using background extraction to segment one or more moving objects from the background portions identified in each of the captured pictures;
    determining, for a time instance of the encoded video bitstream, a predictive random access picture of the plurality of predictive random access pictures with a time stamp closest in time to the time instance;
    determining a background picture associated with the predictive random access picture;
    decoding at least a portion of the predictive random access picture using inter-prediction based on the background picture associated with the predictive random access picture;
    identifying a leading picture in the encoded video bitstream, wherein the leading picture follows the predictive random access picture in decoding order and precedes the predictive random access picture in output order;
    determining, using the predictive random access picture, that the leading picture can use, as a reference picture, at least one picture that precedes the predictive random access picture in decoding order; and
    decoding the leading picture using the at least one picture that precedes the predictive random access picture in decoding order.

2. The method of claim 1, wherein the background picture associated with the predictive random access picture precedes the predictive random access picture in decoding order and has a time stamp closest in time to the time stamp of the predictive random access picture.

3. The method of claim 1, further comprising receiving a message indicating that the predictive random access picture is of a predictive random access type.

4. The method of claim 1, further comprising receiving a message indicating that the background picture associated with the predictive random access picture is of a background picture type.

5. The method of claim 1, wherein the leading picture is associated with a message indicating that the leading picture is associated with the predictive random access picture.

6. The method of claim 1, wherein the leading picture includes a predictive random access decodable leading picture, wherein, when random access is performed based on the predictive random access picture, the predictive random access decodable leading picture is decodable.

7. The method of claim 1, wherein the leading picture includes a predictive random access skipped leading picture, wherein, when random access is performed based on the predictive random access picture, the predictive random access skipped leading picture is not decodable.

8. The method of claim 1, wherein decoding at least the portion of the predictive random access picture using inter-prediction based on the background picture comprises predicting at least the portion of the predictive random access picture using the background picture as a reference picture.

9. The method of claim 8, wherein the background picture is encoded into the encoded video bitstream.

10. The method of claim 9, wherein the background picture is encoded as a long term reference picture.

11. The method of claim 9, wherein the background picture is encoded as a short term reference picture.

12. The method of claim 1, wherein the plurality of pictures are associated with at least one network abstraction layer unit containing at least a portion of the predictive random access picture, wherein a header of the at least one network abstraction layer unit comprises a predictive random access picture type indication assigned to network abstraction layer units of random access pictures encoded using inter-prediction based on one or more background pictures.

13. The method of claim 1, wherein the plurality of pictures are associated with at least one network abstraction layer unit containing at least a portion of the background picture, wherein a header of the at least one network abstraction layer unit comprises a background picture type indication.

14. An apparatus comprising:
a memory configured to store video data; and
a processor configured to:
obtain an encoded video bitstream comprising a plurality of pictures, wherein the plurality of pictures comprise a plurality of predictive random access pictures, and wherein a predictive random access picture is at least partially encoded using inter-prediction based on at least one background picture, wherein the at least one background picture is generated to include one or more background portions identified in each of a plurality of captured pictures, and wherein the at least one background picture is generated using background extraction to segment one or more moving objects from the background portions identified in each of the captured pictures;
determine, for a time instance of the encoded video bitstream, a predictive random access picture of the plurality of predictive random access pictures with a time stamp closest in time to the time instance;
determining a background picture associated with the predictive random access picture;
decoding at least a portion of the predictive random access picture using inter-prediction based on the background picture;
identifying a leading picture in the encoded video bitstream, wherein the leading picture follows the predictive random access picture in decoding order and precedes the predictive random access picture in output order;
determining, using the predictive random access picture, that the leading picture can use, as a reference picture, at least one picture that precedes the predictive random access picture in decoding order; and
decoding the leading picture using the at least one picture that precedes the predictive random access picture in decoding order.

15. The apparatus of claim 14, wherein the background picture associated with the predictive random access picture precedes the predictive random access picture in decoding order and has a time stamp closest in time to the time stamp of the predictive random access picture.

16. The apparatus of claim 14, wherein the processor is further configured to receive a message indicating that the predictive random access picture is of a predictive random access type.

17. The apparatus of claim 14, wherein the processor is further configured to receive a message indicating that the background picture associated with the predictive random access picture is of a background picture type.

18. The apparatus of claim 14, wherein the leading picture includes a message indicating that the leading picture is associated with the predictive random access picture.

19. The apparatus of claim 14, wherein the leading picture includes a predictive random access decodable leading picture.

20. The apparatus of claim 14, wherein the leading picture includes a predictive random access skipped leading picture.

21. The apparatus of claim 14, wherein decoding at least the portion of the predictive random access picture using inter-prediction based on the background picture comprises predicting at least the portion of the predictive random access picture using the background picture as a reference picture.

22. The apparatus of claim 21, wherein the background picture is encoded into the encoded video bitstream.

23. The apparatus of claim 22, wherein the background picture is encoded as a long term reference picture.

24. The apparatus of claim 22, wherein the background picture is encoded as a short term reference picture.

25. The apparatus of claim 14, wherein the plurality of pictures are associated with at least one network abstraction layer unit containing at least a portion of the predictive random access picture, wherein a header of the at least one network abstraction layer unit comprises a predictive random access picture type indication assigned to network abstraction layer units of random access pictures encoded using inter-prediction based on one or more background pictures.

26. The apparatus of claim 14, wherein the plurality of pictures are associated with at least one network abstraction layer unit containing at least a portion of the background picture, wherein a header of the at least one network abstraction layer unit comprises a background picture type indication.

27. A non-transitory computer readable medium having stored thereon instructions that, when executed by one or more processors, cause the one or more processor to:
obtain an encoded video bitstream comprising a plurality of pictures, wherein the plurality of pictures comprise a plurality of predictive random access pictures, and wherein a predictive random access picture is at least partially encoded using inter-prediction based on at least one background picture, wherein the at least one background picture is generated to include one or more background portions identified in each of a plurality of captured pictures, and wherein the at least one background picture is generated using background extraction to segment one or more moving objects from the background portions identified in each of the captured pictures;

determine, for a time instance of the encoded video bitstream, a predictive random access picture of the plurality of predictive random access pictures with a time stamp closest in time to the time instance;

determine a background picture associated with the predictive random access picture;

decode at least a portion of the predictive random access picture using inter-prediction based on the background picture;

identify a leading picture in the encoded video bitstream, wherein the leading picture follows the predictive random access picture in decoding order and precedes the predictive random access picture in output order;

determine, using the predictive random access picture, that the leading picture can use, as a reference picture, at least one picture that precedes the predictive random access picture in decoding order; and decode the leading picture using the at least one picture that precedes the predictive random access picture in decoding order.

28. The non-transitory computer readable medium of claim 27, wherein the background picture associated with the predictive random access picture precedes the predictive random access picture in decoding order and has a time stamp closest in time to the time stamp of the predictive random access picture.

29. The non-transitory computer readable medium of claim 27, further comprising instructions that, when executed by one or more processors, cause the one or more processor to receive a message indicating that the predictive random access picture is of a predictive random access type.

30. The non-transitory computer readable medium of claim 27, further comprising instructions that, when executed by one or more processors, cause the one or more processor to receive a message indicating that the background picture associated with the predictive random access picture is of a background picture type.

* * * * *